(12) United States Patent
Okamoto

(10) Patent No.: US 8,537,407 B2
(45) Date of Patent: Sep. 17, 2013

(54) IMAGE READING DEVICE, CORRECTION METHOD, AND IMAGE PROCESSING METHOD USING AN IMAGE READING DEVICE

(75) Inventor: Tadayuki Okamoto, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 395 days.

(21) Appl. No.: 12/908,416

(22) Filed: Oct. 20, 2010

(65) Prior Publication Data

US 2011/0096370 A1    Apr. 28, 2011

(30) Foreign Application Priority Data

Oct. 23, 2009  (JP) ................ 2009-244606
Oct. 23, 2009  (JP) ................ 2009-244723

(51) Int. Cl.
*G06K 15/00*  (2006.01)
(52) U.S. Cl.
USPC ............. 358/1.17; 358/1.16; 358/444
(58) Field of Classification Search
USPC ............ 358/1.16–1.17, 444; 345/531
See application file for complete search history.

(56) References Cited

U.S. PATENT DOCUMENTS

| | | | |
|---|---|---|---|
| 6,061,351 A | | 5/2000 | Erimli et al. |
| 6,078,684 A | * | 6/2000 | Inoue ............ 382/162 |
| 6,950,337 B2 | * | 9/2005 | Bellini et al. ........ 365/185.13 |
| 7,548,356 B2 | * | 6/2009 | Han et al. ............ 358/497 |
| 7,576,787 B2 | | 8/2009 | Kinoshita |
| 7,636,498 B2 | | 12/2009 | Furukawa et al. |
| 7,676,730 B2 | * | 3/2010 | Haugan et al. ........... 714/769 |
| 2002/0085009 A1 | | 7/2002 | Yamagata |
| 2007/0285739 A1 | | 12/2007 | Nakano et al. |
| 2008/0151670 A1 | | 6/2008 | Kawakubo et al. |
| 2010/0146201 A1 | | 6/2010 | Kawakubo et al. |
| 2010/0172200 A1 | | 7/2010 | Kawakubo et al. |

FOREIGN PATENT DOCUMENTS

| | | |
|---|---|---|
| CN | 1799064 A | 7/2006 |
| CN | 1917655 A | 2/2007 |
| CN | 101076074 A | 11/2007 |
| JP | 2001-119541 | 4/2001 |
| JP | 2002-514366 | 5/2002 |
| JP | 2008-192262 | 8/2008 |
| WO | 98/36530 A1 | 8/1998 |

* cited by examiner

*Primary Examiner* — Benny Q Tieu
*Assistant Examiner* — Quyen V Ngo

(57) ABSTRACT

The data transfer rate of memory disposed in an image reading device is improved. The image reading device has an image scanning sensor and memory that stores correction data, and while writing the captured image data to memory reads the correction data and applies a correction processes to the image data.

6 Claims, 26 Drawing Sheets

600 dpi REFERENCE DATA R1

| ROW ADDRESS | R COMPONENT WHITE REFERENCE DATA Ra | G COMPONENT WHITE REFERENCE DATA Ga | B COMPONENT WHITE REFERENCE DATA Ba | COMMON BLACK REFERENCE DATA Dr |
|---|---|---|---|---|
| N | Ra(A1, A2, ... A79, A80) | Ga(A1, A2, ... A79, A80) | Ba(A1, A2, ... A79, A80) | Dr(A1, A2, ... A79, A80) |
| N+1 | Ra(A81, A82, ... A159, A160) | Ga(A81, A82, ... A159, A160) | Ba(A81, A82, ... A159, A160) | Dr(A81, A82, ... A159, A160) |
| N+2 | Ra(A161, A162, ... A239, A240) | Ga(A161, A162, ... A239, A240) | Ba(A161, A162, ... A239, A240) | Dr(A161, A162, ... A239, A240) |
| ... | ... | ... | ... | ... |
| N+62 | Ra(A4961, ... A5040) | Ga(A4961, ... A5040) | Ba(A4961, ... A5040) | Dr(A4961, ... A5040) |
| N+63 | Ra(A5041, ... A5080) | Ga(A5041, ... A5080) | Ba(A5041, ... A5080) | Dr(A5041, ... A5080) |

COLUMN ADDRESS →

FIG. 19

300 dpi REFERENCE DATA R2

| | R COMPONENT WHITE REFERENCE DATA Ra | G COMPONENT WHITE REFERENCE DATA Ga | B COMPONENT WHITE REFERENCE DATA Ba | COMMON BLACK REFERENCE DATA Dr |
|---|---|---|---|---|
| P | Ra(A1, A3, ... A157, A159) | Ga(A1, A3, ... A157, A159) | Ba(A1, A3, ... A157, A159) | Dr(A1, A3, ... A157, A159) |
| P+1 | Ra(A161, A163, ... A317, A319) | Ga(A161, A163, ... A317, A319) | Ba(A161, A163, ... A317, A319) | Dr(A161, A163, ... A317, A319) |
| P+2 | Ra(A321, A323, ... A477, A479) | Ga(A321, A323, ... A477, A479) | Ba(A321, A323, ... A477, A479) | Dr(A321, A323, ... A477, A479) |
| ... | ... | ... | ... | ... |
| P+31 | Ra(A4801, ... A4959) | Ga(A4801, ... A4959) | Ba(A4801, ... A4959) | Dr(A4801, ... A4959) |
| P+32 | Ra(A4961, ... A5079) | Ga(A4961, ... A5079) | Ba(A4961, ... A5079) | Dr(A4961, ... A5079) |

ROW ADDRESS →

COLUMN ADDRESS →

FIG. 21

| REFERENCE DATA TYPE | SCANNING MODE | RESOLUTION | COLOR/MONOCHROME |
| --- | --- | --- | --- |
| FIRST REFERENCE DATA | FIRST SCANNING MODE | 600 dpi | MONOCHROME |
| SECOND REFERENCE DATA | SECOND SCANNING MODE | 600 dpi | COLOR |
| THIRD REFERENCE DATA | THIRD SCANNING MODE | 300 dpi | MONOCHROME |
| FOURTH REFERENCE DATA | FOURTH SCANNING MODE | 300 dpi | COLOR |

FIG. 26

IMAGE READING DEVICE, CORRECTION METHOD, AND IMAGE PROCESSING METHOD USING AN IMAGE READING DEVICE

CROSS-REFERENCE TO RELATED APPLICATION(S)

Japanese Patent Application No. 2009-244606 and 2009-244723 are hereby incorporated by reference in their entirety.

BACKGROUND

1. Technical Field

The present invention relates to an image reading device, a correction method applied in the image reading device, and to an image processing method using the image reading device.

2. Related Art

Technology for reading images using a scanner or other type of image reading device, applying various image processing techniques (such as correcting shading or gamma correction) to the image data of a scanned image, and then outputting the corrected image data to an external device such as a personal computer, is known from the literature. Such scanners typically have memory (such as SDRAM (Synchronous Dynamic Random Access Memory)) for storing the image data before an image data correction process is applied and correction data used for the image data correction process. Japanese Unexamined Patent Appl. Pub. JP-A-2008-192262, for example, teaches technology related to SDRAM control.

Technology for correcting the image data captured by the scanner or other image reading device, such as correcting skewed images, and outputting the corrected image data is also known from the literature. See, for example, Japanese Unexamined Patent Appl. Pub. JP-A-2001-119541 and Japanese Unexamined Patent Appl. Pub. JP-A-2002-514366.

Such an image reading device with SDRAM according to the related art reads the correction data from the same bank as the bank to which the image data is written and read. If an area specified by a different row address in the same bank is accessed on a time-share basis, a precharge is required each time the memory is accessed and the memory data transfer rate drops.

This problem is not limited to image reading devices with SDRAM, and is generally common to all types of image reading devices having memory with a plurality of banks.

The invention is directed to solving this problem by providing technology that improves the transfer rate of memory disposed in an image reading device.

There are also image reading devices that convey paper on which images are formed and use a plurality of imaging elements arrayed in a line to read the image and produce image data. By using only every n-th imaging element in a row of imaging elements, image data with lower resolution than when all imaging elements are used can be produced.

Such image reading devices may also correct shading in the image data of a captured image by using white and black reference data values (collectively referred to below as "reference data values") for each imaging element. These reference data values are stored in advance in memory in the image reading device.

However, when the image reading device produces low resolution image data and then corrects the shading of the image data, the reference data values needed for the correction must be selected while being read. As a result, the reference data cannot be retrieved at high speed. More particularly, while data can be read quickly using a burst access mode when SDRAM is used as the memory of the image reading device, burst access cannot be used effectively when the reference data required for correction is stored in non-contiguous areas, and the reference data transfer rate drops accordingly. This problem is not limited to shading correction, and is common to all image data correction processes according to the characteristics of the imaging elements of the image reading device.

SUMMARY

The present invention provides technology that can improve the reading rate of correction data stored in memory in an image reading device having memory that stores correction data.

Some embodiments or applications of the invention that solve at least part of the foregoing problem are described below.

A first aspect of the invention is an image reading device having an image reading sensor that captures an image of a subject; memory that has a storage area divided into a plurality of banks, each of the plural banks having an image data storage area for storing image data of the captured image, and stores correction data used for correcting the image data in at least three of the plural banks; a memory control unit that writes the image data to the image data storage area while changing the bank accessed for writing the image data so that the image data is stored in the banks segmented into data units that are smaller than the data capacity of the image data storage area, reads image data stored in the image data storage area from a bank that is different from the bank accessed for writing the image data, and reads the correction data from a bank that is different from the banks that are accessed for writing and reading the image data; and a correction process unit that applies a correction process using the correction data to the read image data.

The image reading device according to this first aspect of the invention reads image data from a bank that is different from the bank being accessed to write image data, and reads correction data from a bank that is different from the bank being accessed to write and read the image data. As a result, precharges can be suppressed and the data transfer rate of memory used in the image reading device can be improved.

In an image reading device according to another aspect of the invention, the correction process corrects shading; and the correction data is white reference data and black reference data used for said shading correction.

The image reading device according to this second aspect of the invention can improve the data transfer rate of the memory when correcting shading.

A third aspect of the invention is a method of correcting image data in an image reading device, the image reading device having memory that has a storage area divided into a plurality of banks, each of the plural banks having an image data storage area for storing image data, and stores correction data used for correcting the image data in at least three of the plural banks, and the method comprising: (a) a step of capturing an image of a subject; (b) a step of writing the image data to the image data storage area while changing the bank accessed for writing the image data so that image data of the captured image is stored in the banks segmented into data units that are smaller than the data capacity of the image data storage area; (c) a step of reading image data stored in the image data storage area from a bank that is different from the bank accessed for writing the image data; (d) a step of reading the correction data from a bank that is different from the banks that are accessed for writing and reading the image data; and (e) a step of applying a correction process using the correction data to the read image data.

A fourth aspect of the invention is an image reading device including a sensor that has a plurality of imaging elements and is an image scanning sensor that captures an image of a subject; a correction unit that applies a correction process according to at least the characteristics of each imaging element to the pixel data in the image data of the captured image; and memory that is SDRAM storing correction data including a plurality of correction data values used in the correction process; wherein the image reading device has a plurality of scanning modes with different reading conditions that are set when capturing an image, the memory stores plural different types of correction data corresponding to the plural scanning modes, and the correction unit applies an image data correction process using correction data appropriate to the scanning mode that is set when capturing image data.

The image reading device according to this aspect of the invention stores correction data appropriate to each scanning mode in memory, and reads the appropriate correction data when applying a correction process to the image data. As a result, the data transfer rate of correction data stored in memory can be improved.

Further preferably in another aspect of the invention, at least part of the plural correction data values are stored continuously to the same row address in memory.

Because at least part of the plural correction data values are stored continuously to the same row address in memory in this aspect of the invention, the correction data can be read in segments in a burst access mode. As a result, the data transfer rate of correction data stored in memory can be improved.

Further preferably in another aspect of the invention, the correction data includes a plurality of correction data blocks each containing a predetermined number of correction data values; and the correction data values of the correction data blocks are stored continuously to the same row address.

The image reading device according to this aspect of the invention can read the correction data by correction data blocks in a burst access mode. As a result, the data transfer rate of correction data stored in memory can be improved.

In an image reading device according to another aspect of the invention, the scanning condition includes resolution as a condition that is set when the image scanning sensor scans a subject.

The image reading device according to this aspect of the invention stores correction data in memory for each scanning mode of a different resolution. As a result, even when correcting image data of different resolutions, the data transfer rate can be improved by reading the correction data appropriate to the scanning mode.

In an image reading device according to another aspect of the invention the scanning condition includes as conditions a color mode that produces color image data based on the scanned subject, and a monochrome mode that produces monochrome image data based on the scanned subject.

The image reading device according to this aspect of the invention stores correction data appropriate to the color mode and correction data appropriate to the monochrome mode in memory. As a result, when correcting image data that was captured in the color mode or monochrome mode, correction data appropriate to the scanning mode can be read and used in the correction process. The data transfer rate of the correction data can therefore be improved.

In an image reading device according to another aspect of the invention, the memory has a plurality of banks that store an image captured by the image scanning sensor as image data; the plural types of correction data are stored in at least two of the plural banks; and the correction unit corrects image data using correction data stored in a bank that is different from the bank storing the image data to be corrected.

The image reading device according to this aspect of the invention reads the image to be corrected and the correction data used to correct the image data from different banks. The number of times different row addresses are accessed (read) in the same bank can therefore be reduced. Because precharges can thus be suppressed, the data transfer rates of the image data and correction data stored in memory can be improved.

In an image reading device according to another aspect of the invention, the correction data includes white reference data denoting a standard white reference value, and black reference data denoting a standard black reference value. This aspect of the invention can therefore improve throughput when correcting shading in the image data.

The invention can be rendered in other ways than the image reading device, correction method, and image processing method using an image reading device described above. For example, the invention can be rendered as method of storing correction data in memory, an image data correction method and device, an image data correction system, an integrated circuit rendering the functions of these methods or devices, a computer program, and a recording medium that stores the computer program.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 19 describes storing reference data R1 for a 600 dpi resolution.

FIG. 21 describes storing reference data R1 for a 300 dpi resolution.

FIG. 26 describes the correlation between reading mode and reference data.

DESCRIPTION OF EMBODIMENTS

Preferred embodiments of the invention are described below in the following sequence.

A. Embodiment 1
B. Embodiment 2
C. Embodiment 3
D. Variation 1
E. Variation 2

A. Embodiment 1

Figure 1:
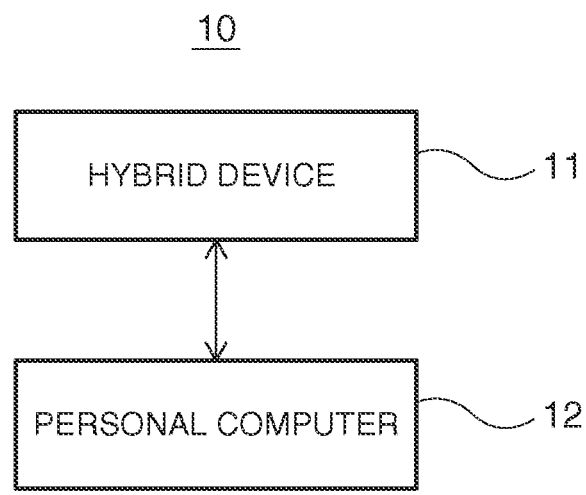
FIG. 1 is a block diagram showing the configuration of an image reading and printing system including a hybrid device 11 and a personal computer 12 as a first embodiment of the invention.

FIG. 1 is a block diagram of the configuration of an image reading and printing system as a first embodiment applying the invention.

The image reading and printing system 10 includes a hybrid scanner/printer device 11 as an image reading device (referred to below as simply a hybrid device 11), and a personal computer 12 that is connected to the hybrid device 11.

The hybrid device 11 can generate personal verification data for a check by reading both a check and an identity card or driver license, for example, that verifies the identity of the person presenting a check. The hybrid device 11 can also write (print) on the check. The personal computer 12 controls operation and processes data output by the hybrid device 11.

Figure 2:
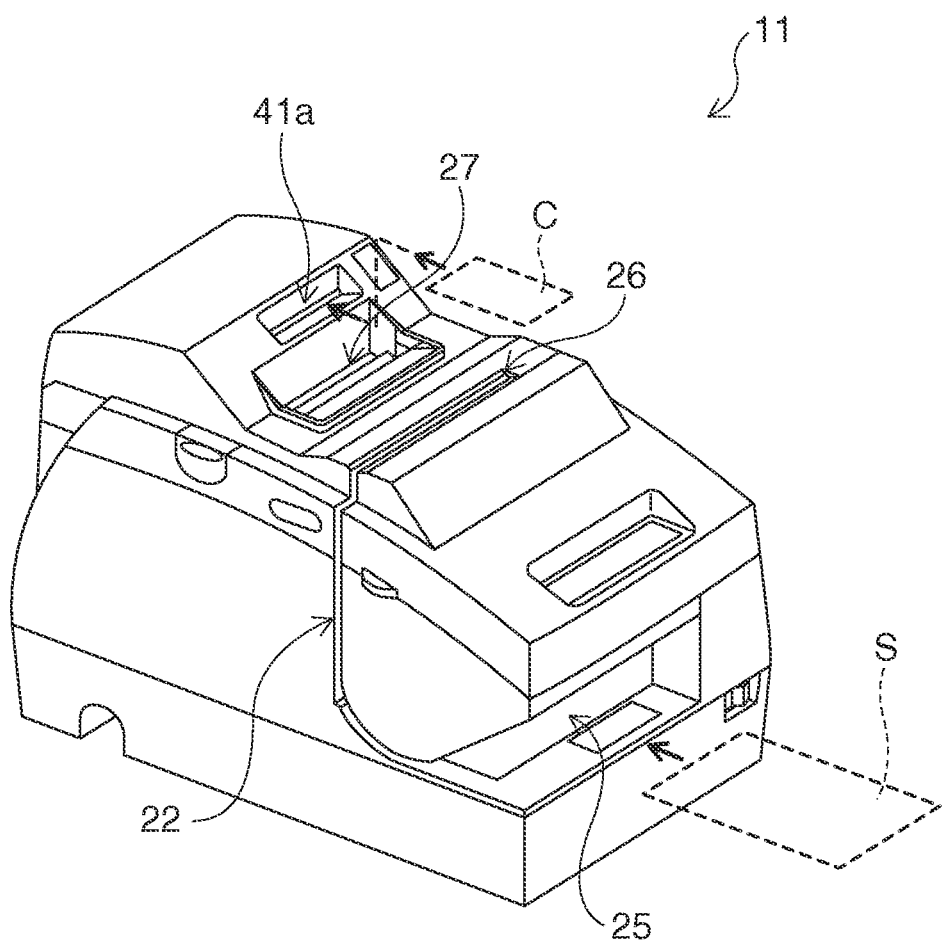
FIG. 2 is an oblique view of the hybrid device 11.

FIG. 2 is an oblique view showing the outside of the hybrid device 11. This hybrid device 11 processes roll paper, checks and other cut sheet S media, and cards C such as identification cards.

The hybrid device 11 has a cut sheet insertion opening 25 for inserting cut sheet S media, a cut sheet transportation path 22 through which the inserted cut sheets S are conveyed, and a cut sheet exit 26 from which the conveyed cut sheet S is discharged. The hybrid device 11 also has a roll paper exit 27 from which roll paper (not shown in the figure) stored internally is discharged, and a card insertion opening 41a from which a cards C are inserted. The hybrid device 11 also has an internal print mechanism for printing on roll paper.

Figure 3:
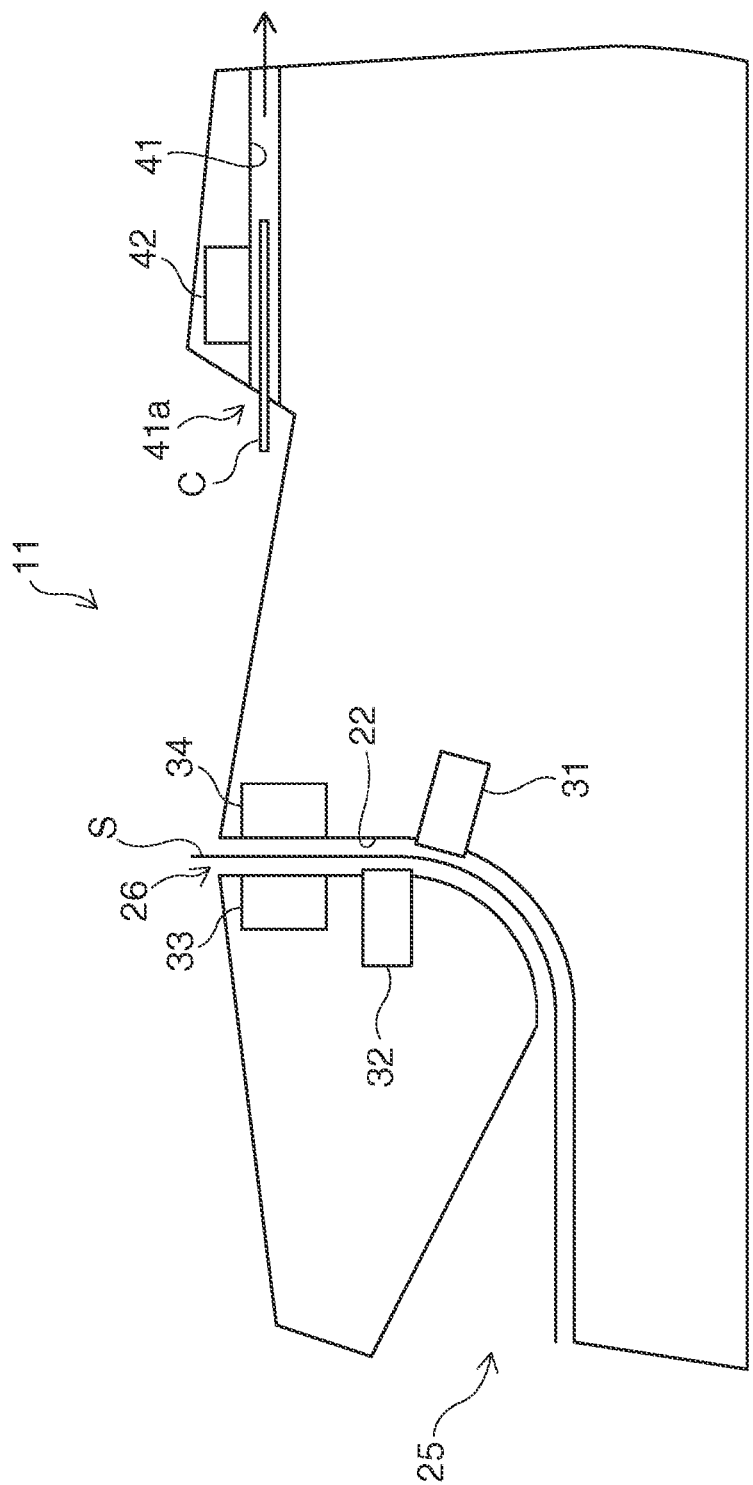
FIG. 3 is a section view showing main parts of the hybrid device 11 particularly around the cut paper transportation path 22.

FIG. 3 is a section view showing the mains parts of the hybrid device 11 and particularly the parts around the cut sheet transportation path 22. A back-side printing unit 31 for printing on the back of a cut sheet S, and a front-side printing unit 32 for printing on the front of a cut sheet S, are disposed inside the cut sheet transportation path 22. The hybrid device 11 can thus print on both sides of a cut sheet S inserted from the cut sheet insertion opening 25 by means of the back-side printing unit 31 and front-side printing unit 32.

A first image reading sensor 33 for scanning images on the front of a cut sheet S, and a second image reading sensor 34 for scanning images on the back of a cut sheet S, are disposed near the cut sheet exit 26 of the cut sheet transportation path 22. In this first embodiment of the invention and each of the embodiments described below, the first image reading sensor 33 and second image reading sensor 34 are rendered using contact image sensor (CIS) type image scanners.

A card C inserted from the card insertion opening 41a is conveyed through the card transportation path 41 by a card transportation mechanism (not shown in the figure) rendered using a plurality of rollers. A card image reading sensor 42 for scanning the front of a card C is disposed to the card transportation path 41. Like the first image reading sensor 33 and second image reading sensor 34, the card image reading sensor 42 in this first embodiment of the invention is rendered using a CIS image scanner.

The hybrid device 11 can thus scan and capture images of the front and back sides of a check inserted as a cut sheet S using the first image reading sensor 33 and second image reading sensor 34, and can read a driver license, identity card, or other type of card C presented by the check user using the card image reading sensor 42. The hybrid device 11 can thus easily generate check user verification data by reading a check and reading an identify card or license, for example, to verify the identity of the check user.

Figure 4:
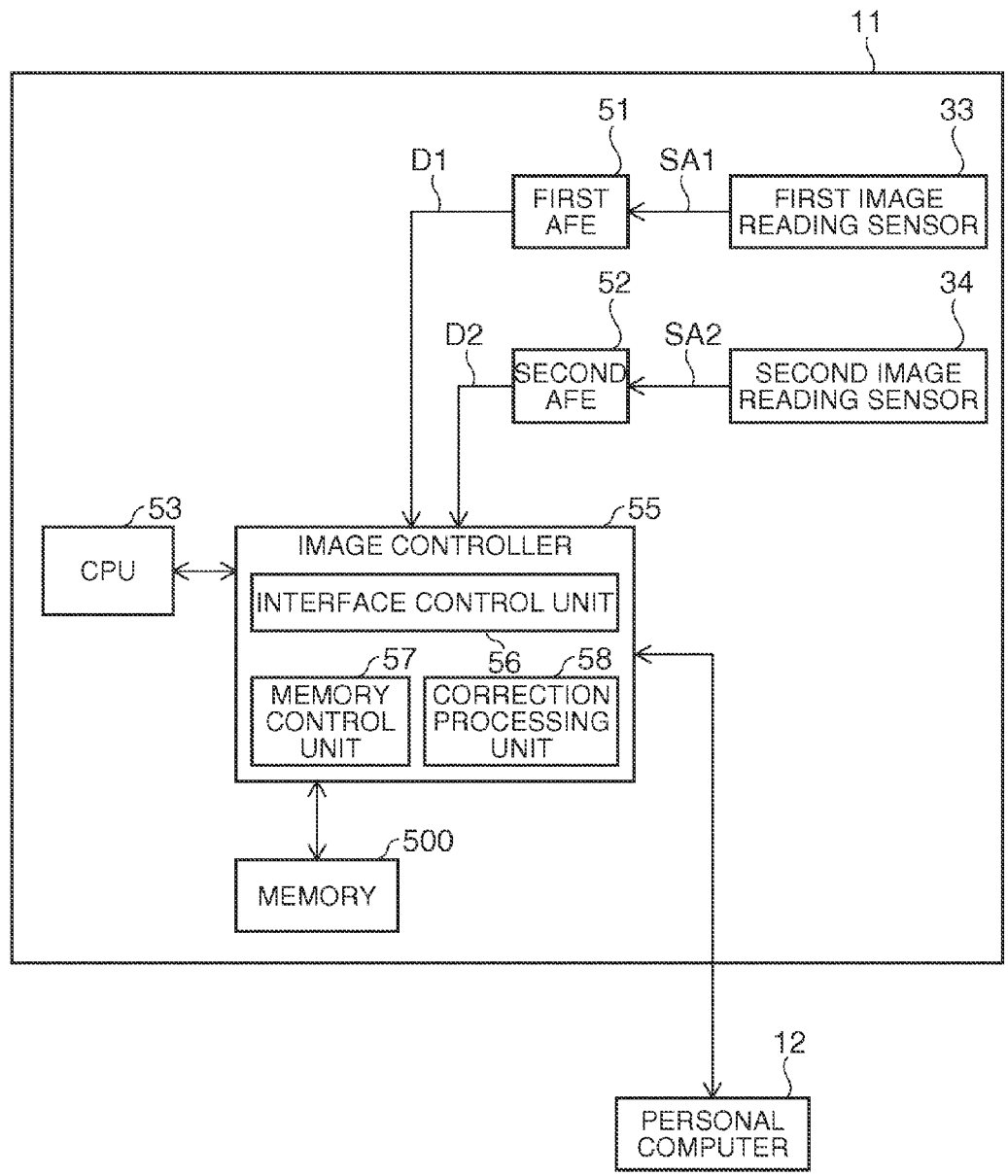
FIG. 4 is a block diagram showing the main parts of the hybrid device 11.

FIG. 4 is a block diagram showing the configuration of the mains parts of the hybrid device 11. The hybrid device 11 has the first and second image reading sensors 33 and 34 described above, first and second analog front ends (AFE) 51 and 52, a CPU 53, memory 500, and an image controller 55 rendered by a FPGA (Field Programmable Gate Array).

The first AFE 51 analog/digital (A/D) converts an input first analog read signal SA1 output from the first image reading sensor 33, and outputs the result as front image data D1. The second AFE 52 similarly A/D converts an input second analog read signal SA2 output from the second image reading sensor 34, and outputs the result as back image data D2.

The CPU 53 controls overall operation of the hybrid device 11. As described below, the memory 500 is SDRAM configured with eight banks, and stores the front image data D1, back image data D2, and correction data (described below).

The image controller 55 includes an interface control unit 56 that controls interface operations between other devices, a memory control unit 57 that controls writing the image data D1 and D2 to memory 500 and reading from memory 500, and a correction processing unit 58 that controls correcting the image data D1 and D2 read from the memory 500.

Figure 5:
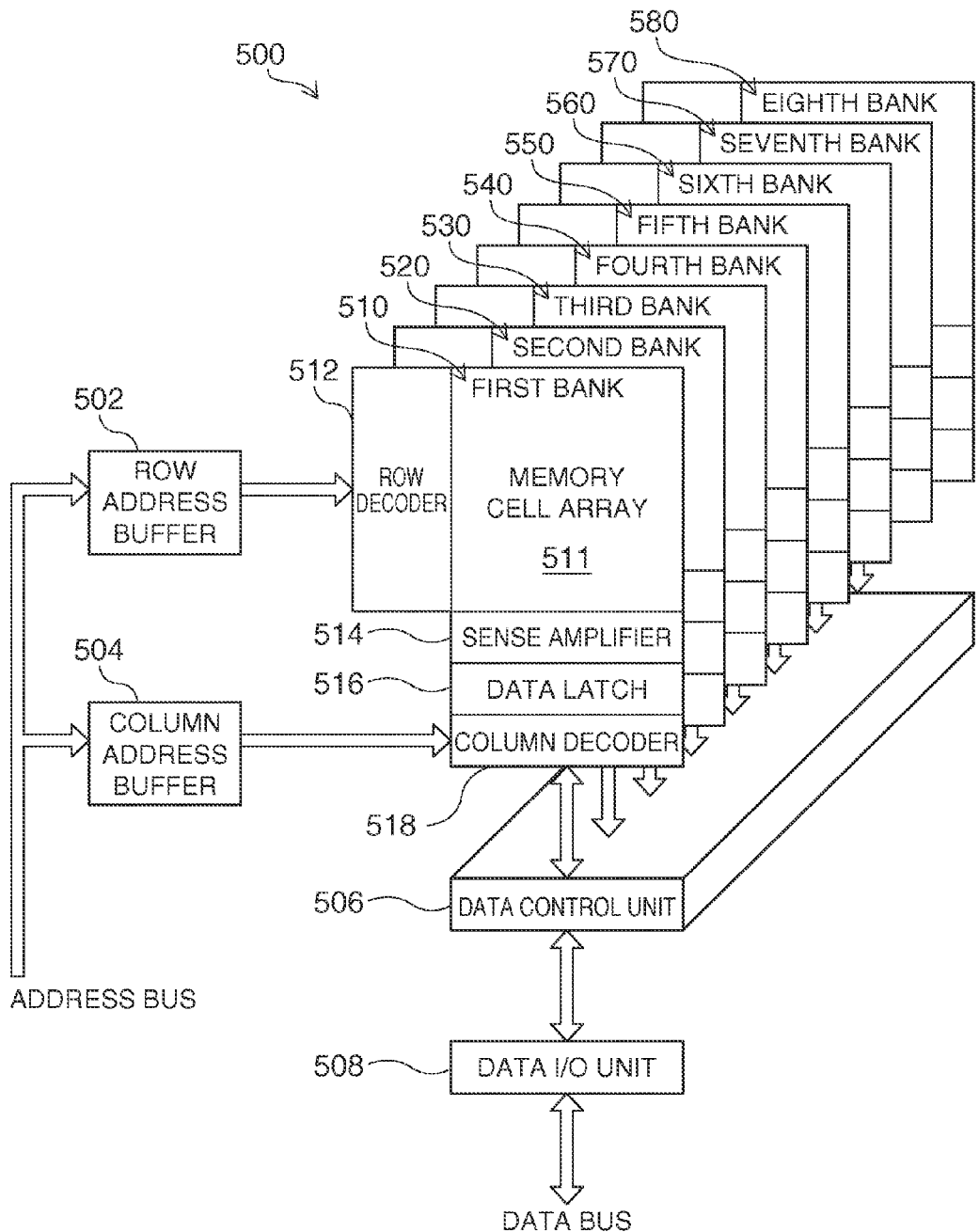
FIG. 5 describes the internal configuration of the memory 500.

FIG. 5 describes the internal configuration of the memory 500. The memory 500 includes eight banks 510, 520, 530, 540, 550, 560, 570, 580, a row address buffer 502, a column address buffer 504, a data control unit 506, and a data I/O unit 508.

The first bank 510 includes a memory cell array 511, row decoder 512, sense amplifier 514, data latch 516, and column decoder 518. The second bank 520 to eighth bank 580 likewise include a memory cell array, row decoder, sense amplifier, data latch, and column decoder.

Of the addresses supplied from the address bus, the high 3 bits are used as a bank address, and the remaining 30 bits are used as a cell address for specifying a particular memory cell in the memory cell array. The row address composed of the high bits of the cell address is stored in the row address buffer 502. The column address composed of the low bits of the cell address is stored in the column address buffer 504. The row address stored in the row address buffer 502 is supplied to a row decoder rendered in each bank. The column address stored in the column address buffer 504 is supplied to a column decoder rendered in each bank.

Data stored in the area (row) specified by the row address is amplified by the sense amplifier 514 and supplied to the data latch 516. The data control unit 506 inputs and outputs data to the column decoder disposed in the bank selected by the bank address. Data is communicated between the selected bank and the image controller 55 (FIG. 4) through a data bus connected to the data I/O unit 508.

FIG. 6 to FIG. 12 describe the processes of writing and reading image data in the eight banks over time. Note that the cells surrounded by a bold dotted line in FIG. 6 to FIG. 12 denote write cells, and cells denoted by a solid bold line in FIG. 11 and FIG. 12 denote read cells. Furthermore, while actual memory devices have storage areas denoted by many more row addresses, only storage cells denoted by row addresses #0 to #23 are shown in this embodiment for brevity. Cells with crosshatching denote cells where data is stored.

In this embodiment of the invention the memory control unit 57 of the image controller 55 uses the first bank 510, second bank 520, third bank 530, and fourth bank 540 for storing front image data D1, and uses the fifth bank 550, sixth bank 560, seventh bank 570, and eighth bank 580 for storing back image data D2. In addition, the image data storage cells used for storing image data in each bank are the cells addressed by row addresses #0 to #21.

Correction data (white reference data and black reference data) used for shading the image data D1 and D2 is stored in advance in the cells addressed by row addresses #22 and #23. Shading correction is correction that is applied to remove variations in the sensitivity of individual imaging elements and variations in the amount of light from the light sources used by the image reading sensors 33 and 34.

The white reference data is acquired by each imaging element reading a standard white reference when the light source is on, and the black reference data is acquired by each imaging element reading a standard black reference when the light source is off. This correction data includes first correction data that is used to correct the shading of the front image data D1 captured by the first image reading sensor 33, and second correction data that is used to correct the shading of the back image data D2 captured by the second image reading sensor 34. Correction values for each imaging element are contained in the first correction data and second correction data. Each of the eight banks store the same first correction data and second correction data in this embodiment of the invention.

Figure 6:
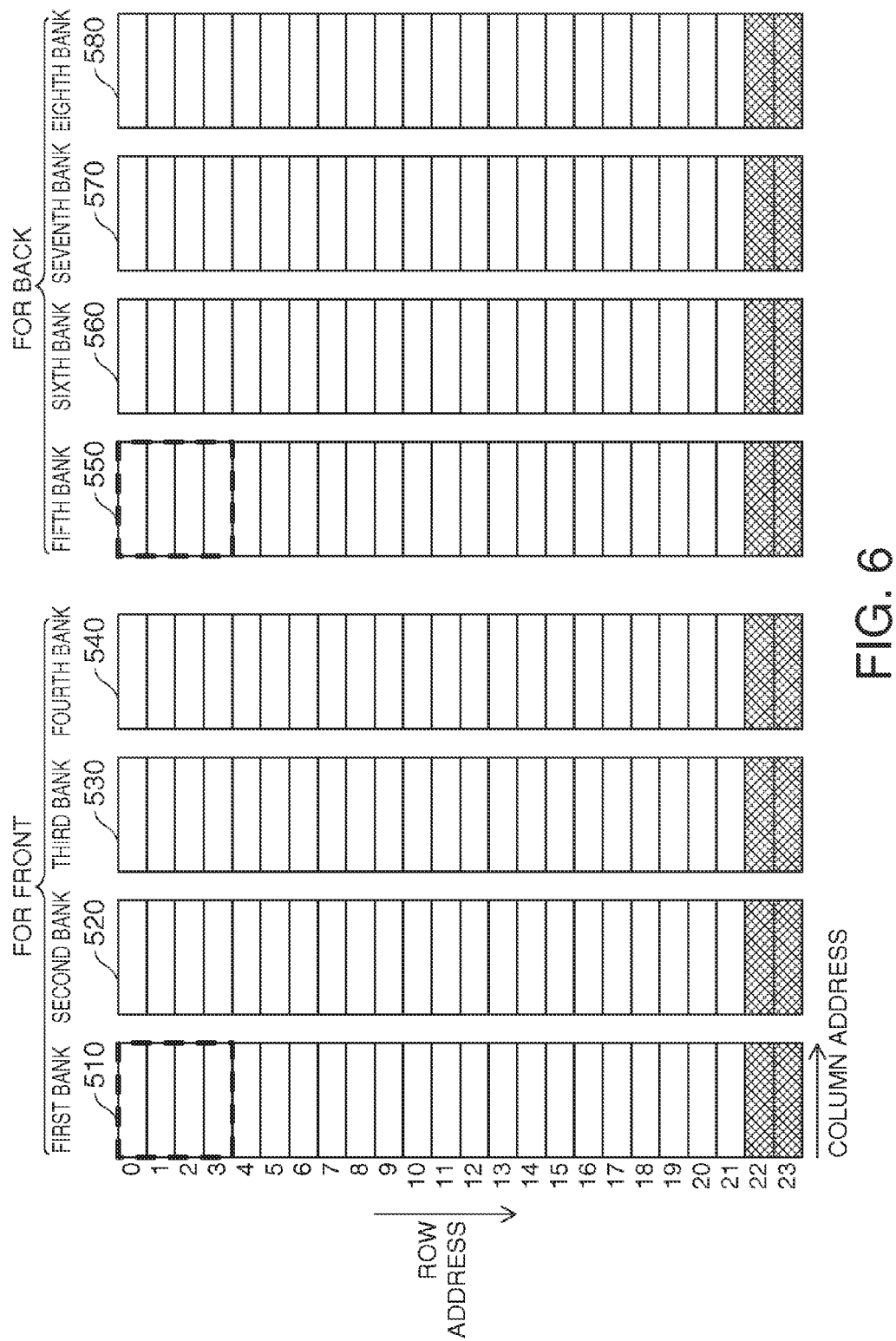
FIG. 6 describes the process of writing image data to the first bank 510 and fifth bank 550.

As shown in FIG. 6, the memory control unit 57 of the image controller 55 sequentially writes the front image data D1 from the area specified by row address #0 to the area addressed by row address #3 in the first bank 510, and sequentially writes the back image data D2 from the area addressed by row address #0 to the area addressed by row address #3 in the fifth bank 550. The front image data D1 and back image data D2 are written on a time shared access basis. Note that all of the following operations reading and writing memory 500 are executed by means of time shared access.

Figure 7:
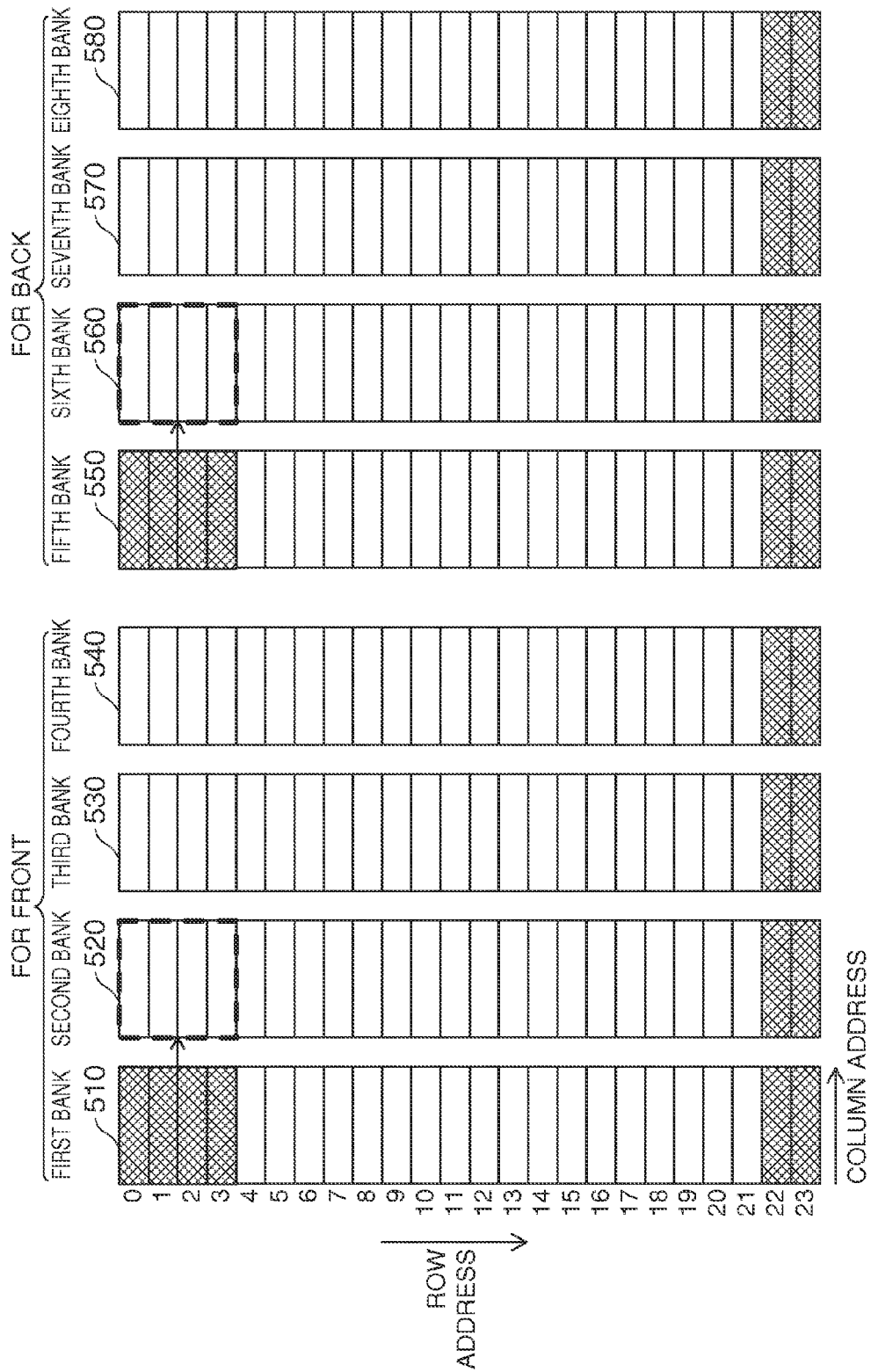
FIG. 7 describes the process of writing image data to the second bank 520 and sixth bank 560.

As shown in FIG. 7, when writing the front image data D1 to the cell addressed by row address #3 in first bank 510 is completed, the memory control unit 57 changes the front image data D1 write destination to the second bank 520. When writing the back image data D2 to the cell addressed by row address #3 in the fifth bank 550 is completed, the memory control unit 57 changes the back image data D2 write destination to the sixth bank 560.

Figure 8:
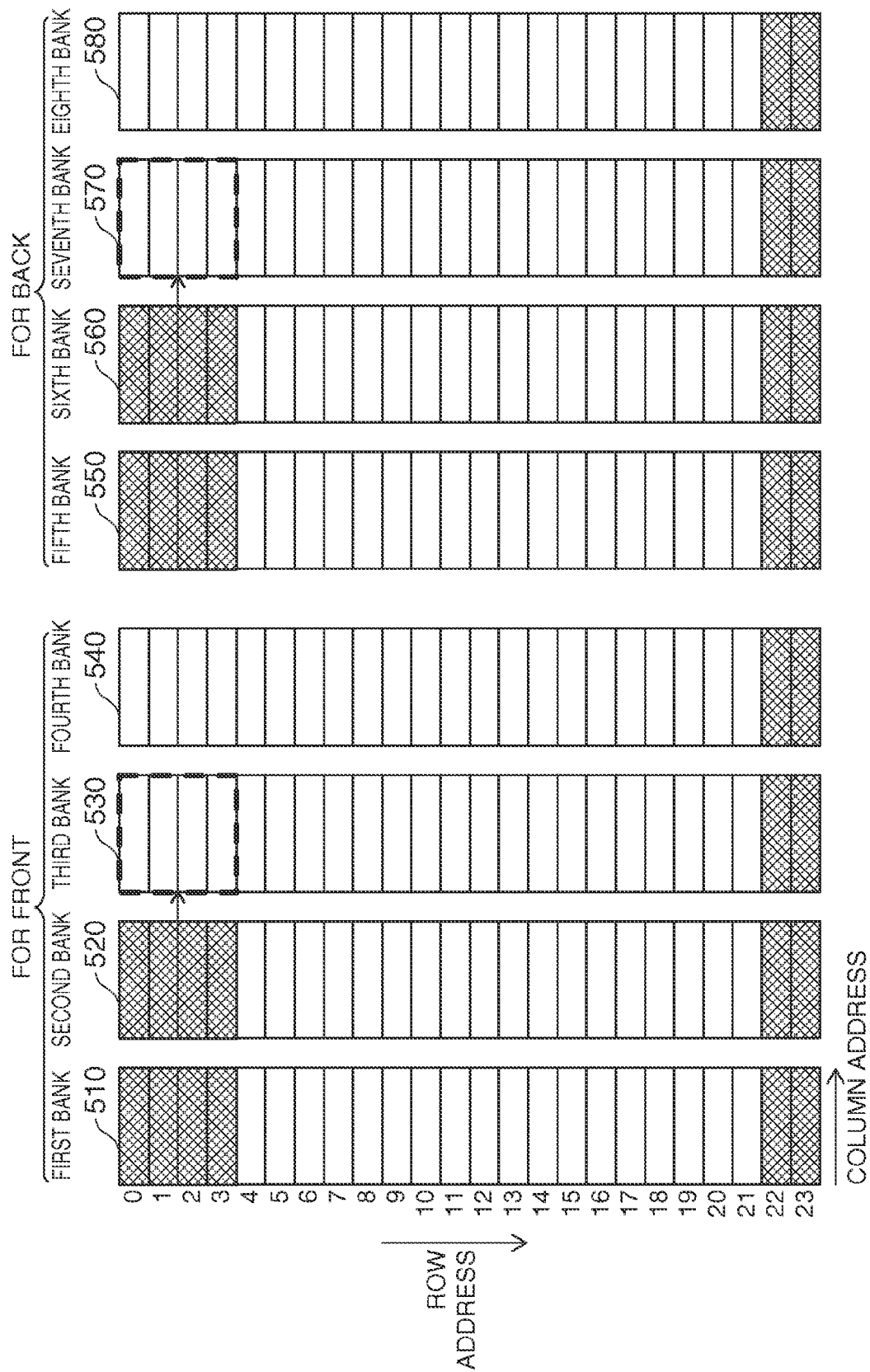
FIG. 8 describes the process of writing image data to the third bank 530 and seventh bank 570.
Figure 9:
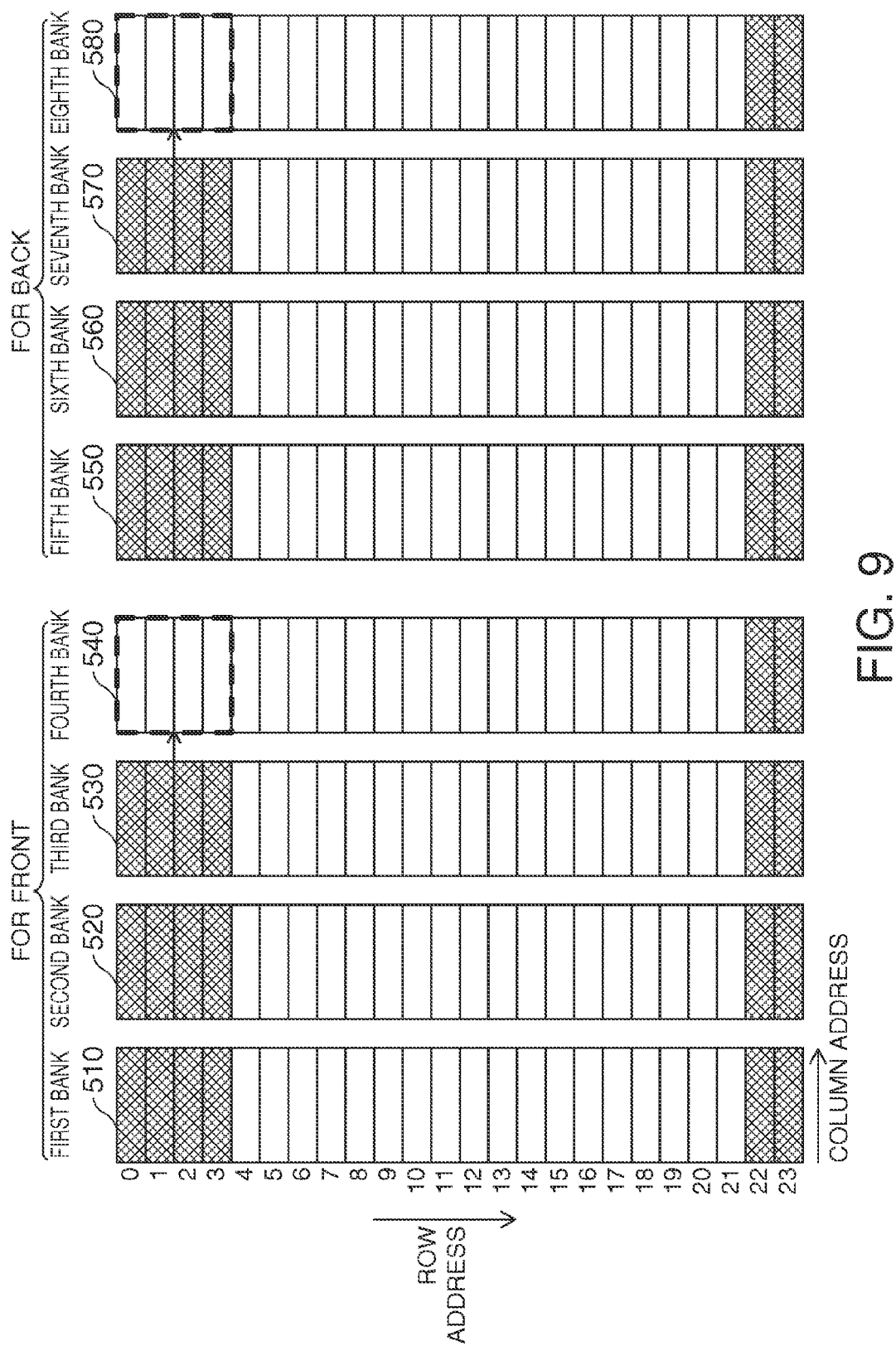
FIG. 9 describes the process of writing image data to the fourth bank 540 and eighth bank 580.

Likewise, as shown in FIG. 8 and FIG. 9, each time writing to the areas specified by the four row addresses is completed, the memory control unit 57 sequentially switches the bank that is written to the next memory bank. More specifically, the memory control unit 57 changes the bank to which image data is written so that the image data is stored in each bank segmented into data blocks that are smaller than the total storage capacity of the image data storage area of each bank.

Figure 10:
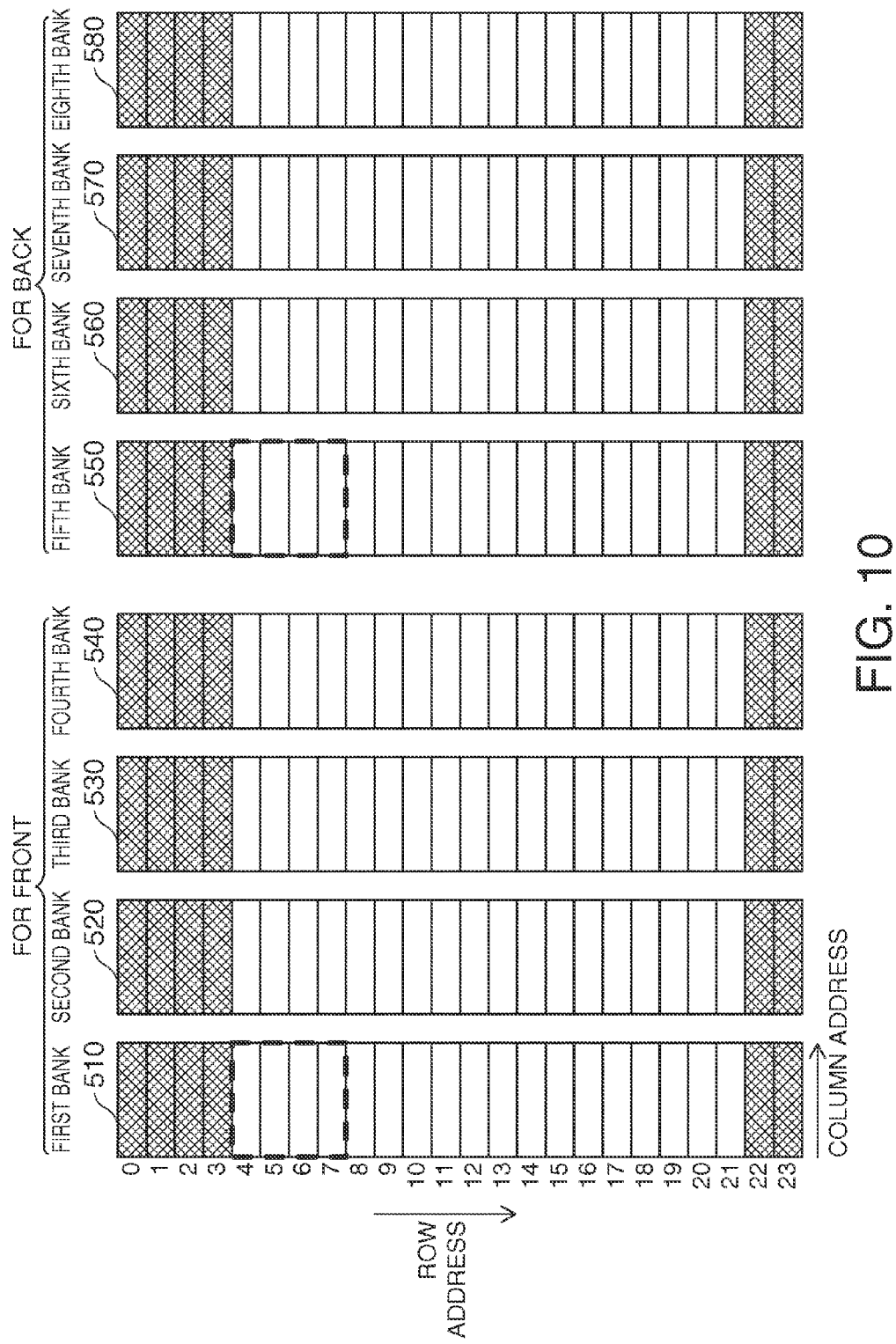
FIG. 10 describes the process of writing image data to the first bank 510 and fifth bank 550.

As shown in FIG. 10, when writing the front image data D1 to the area specified by row address #3 in the fourth bank 540 is completed, the memory control unit 57 changes the front image data D1 write address back to the first bank 510. When writing the back image data D2 to the area specified by row address #3 in the eighth bank 580 is completed, the memory control unit 57 similarly changes the back image data D2 write address back to the fifth bank 550.

Figure 11:
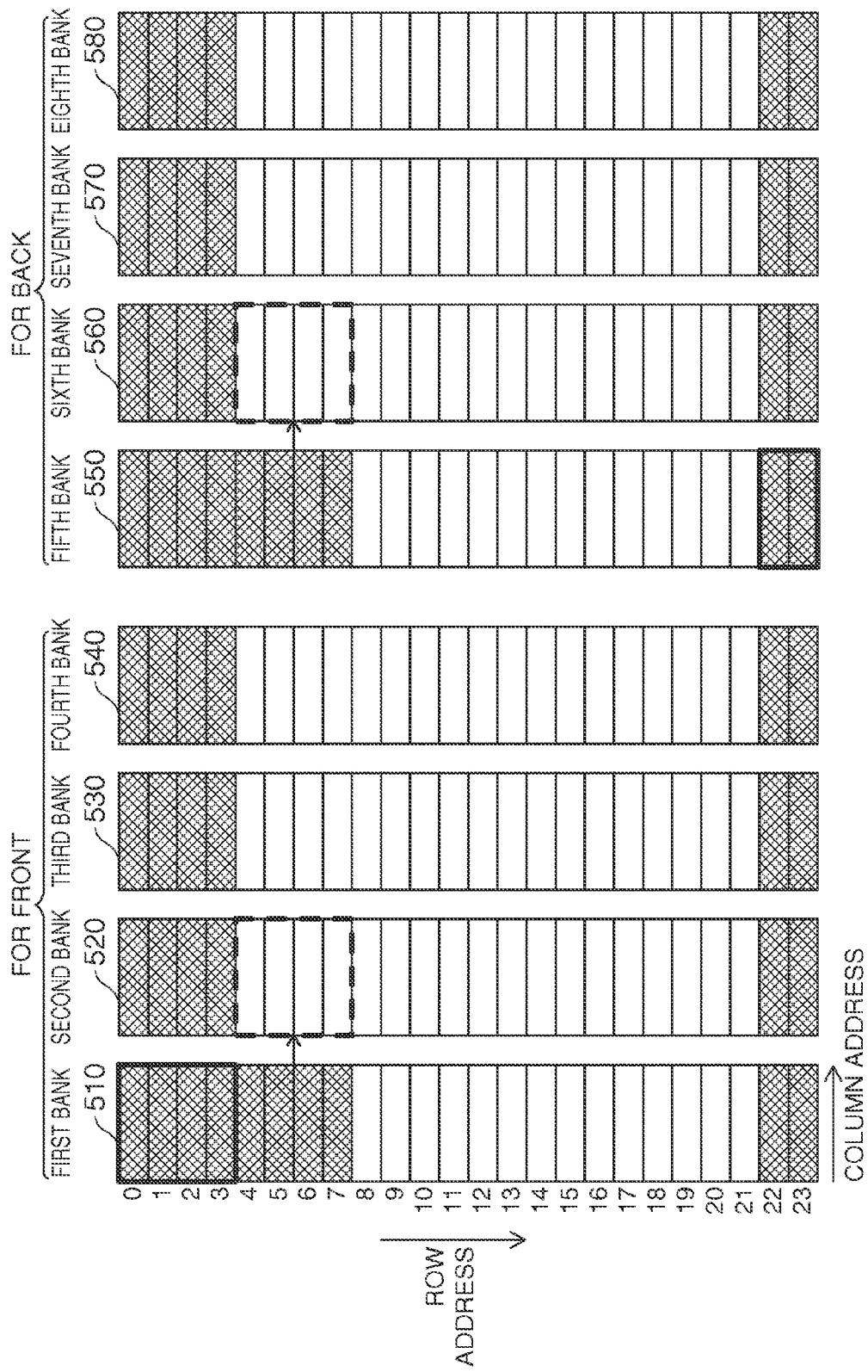
FIG. 11 describes the process of writing image data to the second bank 520 and sixth bank 560 while image data is read from the first bank 510 and correction data is read from the fifth bank 550.

As shown in FIG. 11, when writing the front image data D1 to the cell addressed by row address #7 in first bank 510 is completed, the memory control unit 57 changes the front image data D1 write destination to the second bank 520. When writing the back image data D2 to the cell addressed by row address #7 in the fifth bank 550 is completed, the memory control unit 57 changes the back image data D2 write destination to the sixth bank 560.

When the write address of the front image data D1 changes to the second bank 520 and the write address of the back image data D2 changes to the sixth bank 560, the memory control unit 57 sequentially reads the front image data D1 stored from the area specified by row address #0 to the area specified by row address #3 in the first bank 510, and also sequentially reads the first correction data (white reference data and black reference data) stored from the area specified by row address #22 to the area specified by row address #23 in the fifth bank 550. The correction processing unit 58 of the image controller 55 applies shading correction using the read first correction data to the read front image data D1, and sends the corrected front image data D1 to the personal computer 12.

As described above, each of the eight memory banks stores the same first correction data and second correction data in this first embodiment of the invention. The memory control unit 57 can therefore read the first correction data and second correction data regardless of which of the eight banks is selected. More specifically, the memory control unit 57 can read the first correction data for correcting the shading of the front image data D1 from the seventh bank 570, for example, and can read the second correction data for correcting the shading of the back image data D2 from the first bank 510. In this first embodiment of the invention the memory control unit 57 selects the bank from which the correction data is to be read according to specific rules from among the banks to which the image data D1 and D2 is not written and image data is not read. The method of selecting the bank from which this correction data is read is described below.

Figure 12:
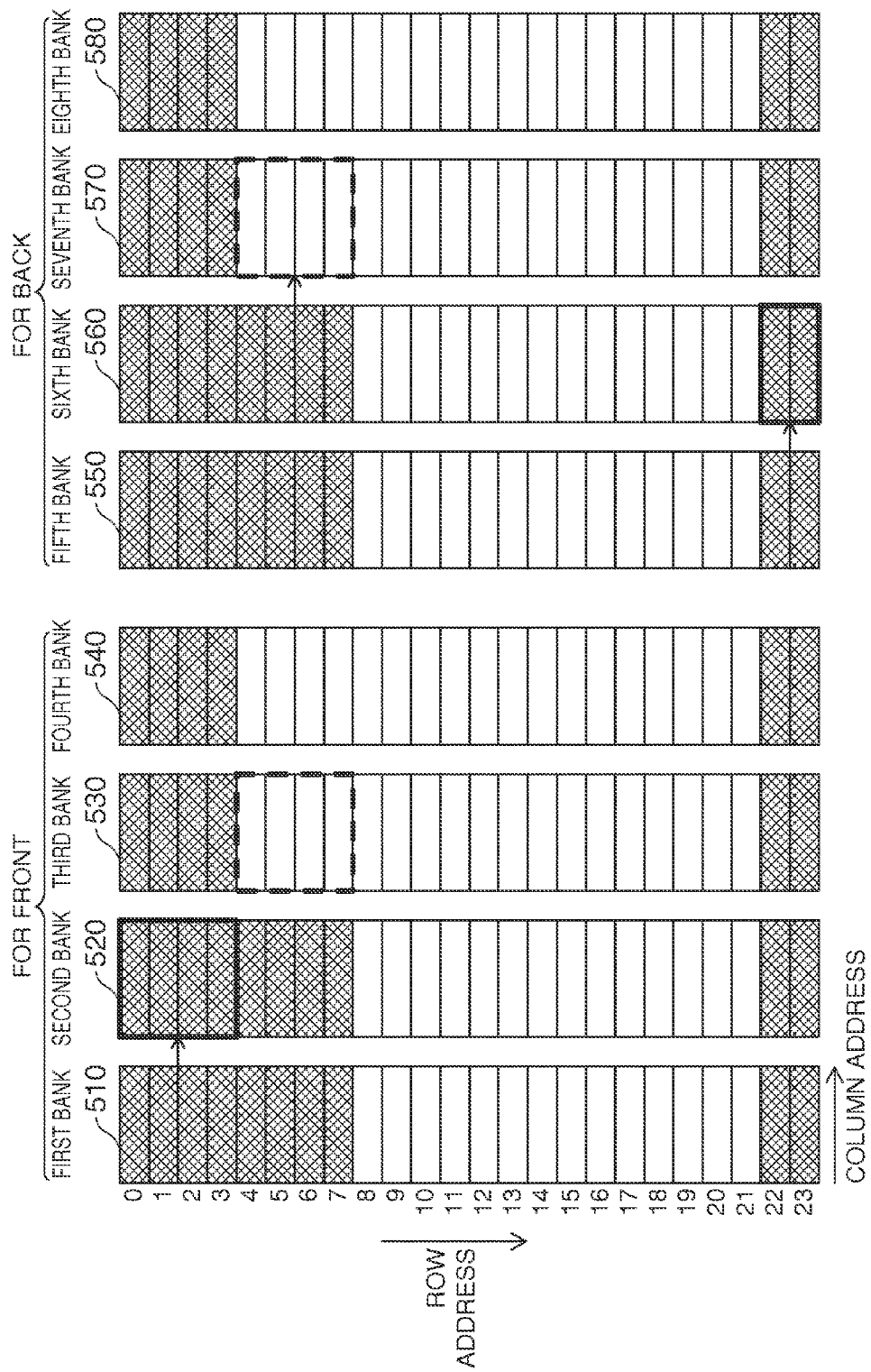
FIG. 12 describes the process of writing image data to the third bank 530 and seventh bank 570 while image data is read from the second bank 520 and correction data is read from the sixth bank 560.

As shown in FIG. 12, when writing the front image data D1 to the area specified by row address #7 in the second bank 520 is completed, the memory control unit 57 starts writing the front image data D1 to the third bank 530. Likewise, when writing the back image data D2 to the area addressed by row address #7 in the sixth bank 560 is completed, the memory control unit 57 starts writing the back image data D2 to the seventh bank 570.

If reading the front image data D1 stored from the area specified by row address #0 to the area specified by row address #3 in the first bank 510 is completed, and the write destination of the front image data D1 has changed from the second bank 520 to the third bank 530, the memory control unit 57 sequentially reads the front image data D1 stored in the second bank 520 from the area specified by row address #0 to the area specified by row address #3 when the following two conditions are satisfied.

Furthermore, if the write destination of the back image data D2 has changed from the sixth bank 560 to the seventh bank 570, the memory control unit 57 sequentially reads first correction data stored from the area specified by row address #22 to the area specified by row address #23 in the sixth bank 560.

The correction processing unit 58 applies a shading correction process to the read front image data D1 using the read first correction data, and sends the corrected front image data D1 to the personal computer 12. Here and below, the memory control unit 57 writes the front image data D1 and back image data D2, and reads the front image data D1 and first correction data, by time shared memory access. Note that in this embodiment of the invention reading the back image data D2 and second correction data occurs after reading the front image data D1 is completed through an area specified by a particular row address.

Figure 13:
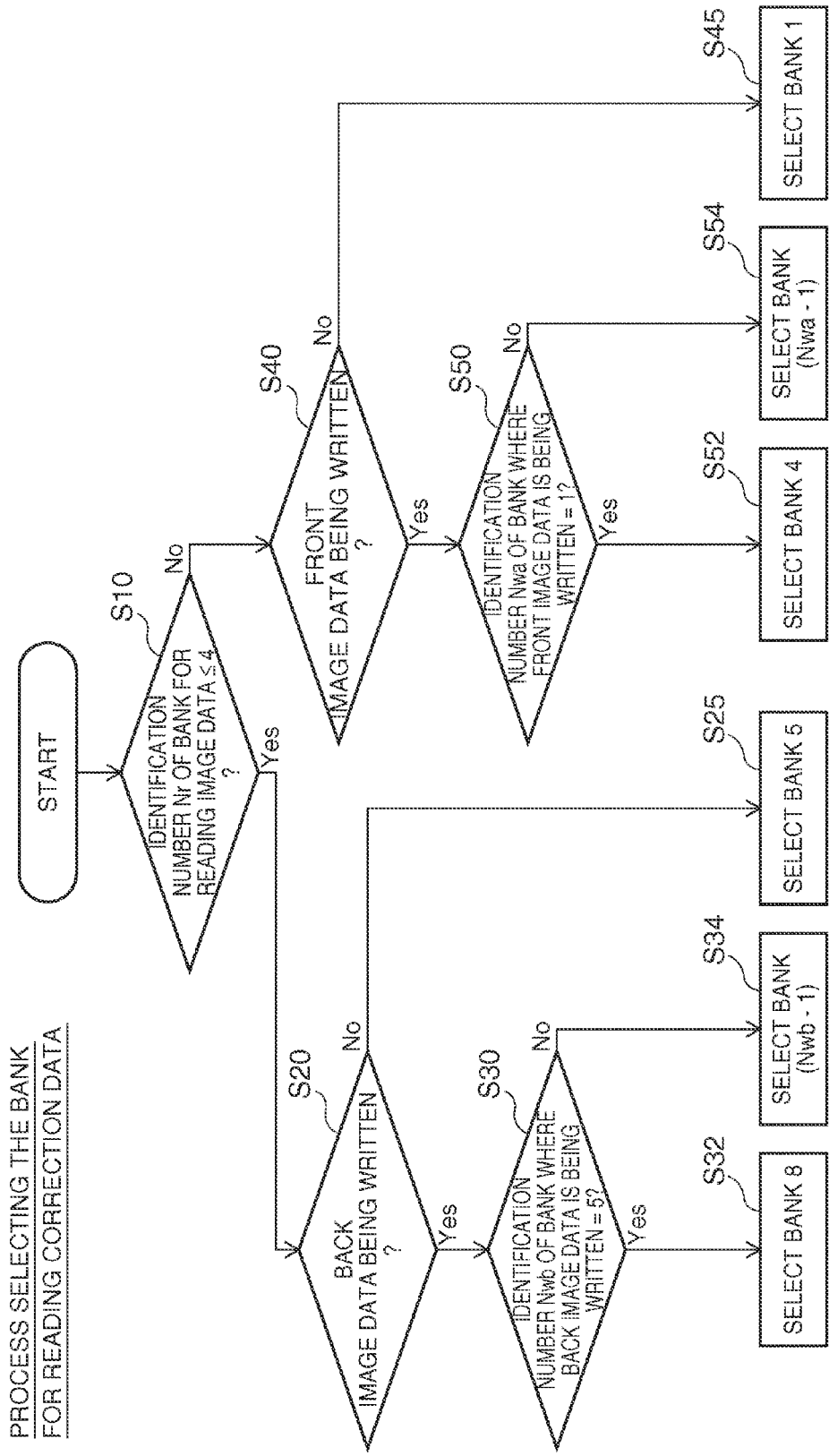
FIG. 13 is a flowchart of the process that selects the bank from which correction data is read.

FIG. 13 is a flow chart of the process for selecting the bank from which to read the correction data.

In step S10, the memory control unit 57 determines if the identification number Nr of the bank from which image data is read is 4 or less. The bank identification number is a number assigned to each bank, and in this embodiment of the invention the identification number of the first bank 510 is 1, and the identification number of the fifth bank 550 is 5. More specifically, the memory control unit 57 determines in step S10 if the data to be read is front image data D1 stored in any of the first bank 510 to the fourth bank 540, or is back image data D2 stored in any of the fifth bank 550 to eighth bank 580.

If in step S10 the memory control unit 57 determines that the identification number Nr of the bank from which image data is read is 4 or less (step S10 returns Yes), that is, that front image data D1 is being read, the memory control unit 57 goes to step S20. In step S20, the memory control unit 57 determines if back image data D2 is being written.

If in step S20 the memory control unit 57 determines the back image data D2 is not being written (step S20 returns No), the memory control unit 57 goes to step S25. In step S25, the memory control unit 57 selects the fifth bank 550 for reading the first correction data.

If in step S20 the memory control unit 57 determines the back image data D2 is being written (step S20 returns Yes), the memory control unit 57 goes to step S30. In step S30, the memory control unit 57 determines if the identification number Nwb of the bank for writing the back image data D2 is 5.

If in step S30 the memory control unit 57 determines the identification number Nwb of the bank to which the back image data D2 is being written is 5 (step S30 returns Yes), in step S32 the memory control unit 57 selects the eighth bank 580 for reading the first correction data.

If in step S30 the memory control unit 57 determines the identification number Nwb of the bank for writing the back image data D2 is not 5 (step S30 returns No), the memory control unit 57 goes to step S34. In step S34 the memory control unit 57 selects bank (Nwb−1) for reading the first correction data. That is, the memory control unit 57 selects the bank with an identification number 1 less than the identification number of the bank to which the back image data D2 is being written.

If in step S10 the memory control unit 57 determines that the identification number Nr of the bank from which image data is read is not 4 or less (step S10 returns No), that is, that back image data D2 is being read, the memory control unit 57 goes to step S40. In step S40 the memory control unit 57 determines if front image data D1 is being written.

If in step S40 the memory control unit 57 determines the front image data D1 is not being written (step S40 returns No), in step S45 the memory control unit 57 selects the first bank 510 for reading the second correction data.

If in step S40 the memory control unit 57 determines the front image data D1 is being written (step S40 returns Yes), the memory control unit 57 determines in step S50 if the identification number Nwa of the bank for writing the front image data D1 is 1.

If in step S50 the memory control unit 57 determines the identification number Nwa of the bank for writing the front image data D1 is 1 (step S50 returns Yes), the memory control unit 57 goes to step S52. In step S52 the memory control unit 57 selects the fourth bank 540 for reading the second correction data.

However, if in step S50 the memory control unit 57 determines the identification number Nwa of the bank for writing the front image data D1 is not 1 (step S50 returns No), the memory control unit 57 goes to step S54. In step S54 the memory control unit 57 selects bank (Nwa−1) for reading the second correction data. That is, the memory control unit 57 selects the bank with an identification number 1 less than the identification number of the bank to which the front image data D1 is being written.

If the bank from which the correction data is read is selected according to such a rule, writing the image data D1 and D2, reading the front image data D1, and reading the first correction data can be done by accessing different banks. Likewise, image data D1 and D2 can be written, the back image data D2 can be read, and the second correction data can be read by accessing different banks. Note that in this embodiment of the invention as described above, the back image data D2 and second correction data are read after reading the front image data D1 is completed to an area specified by a particular row address.

As described above, when the memory control unit 57 writes and reads image data in this first embodiment of the invention, the memory control unit 57 sequentially changes the bank to which image data is written, and reads image data from a bank different from the bank used for writing. In addition, in this first embodiment of the invention, the memory control unit 57 reads the correction data from a bank that is different from the bank to which image data is being written and the bank from which image data is being read.

This embodiment of the invention can therefore suppress the occurrence of time shared access (write processes and read processes) to areas specified by different row addresses in the same bank. Because time shared access to areas specified by different row addresses in the same bank can be suppressed, precharging can be suppressed, and the data transfer rate of the memory 500 can be improved.

Furthermore, because the data transfer rate of the memory 500 can be kept uniform, the capacity of the memory 500 used to temporarily store image data can be reduced. Yet further, the memory control unit 57 in this embodiment of the invention reads and writes image data and reads the correction data according to a predetermined procedure. As a result, the memory control unit 57 does not need to execute a complicated control process to manage the addresses accessed in memory 500, and faster processing is thereby enabled.

B. Embodiment 2

An image reading and printing system according to this second embodiment of the invention is configured similarly to the first embodiment as shown in FIG. 1 and FIG. 2, like parts in the image reading and printing system 10 according to the foregoing first embodiment and this second embodiment are identified by like reference numerals, and further description thereof is omitted.

Figure 14A:
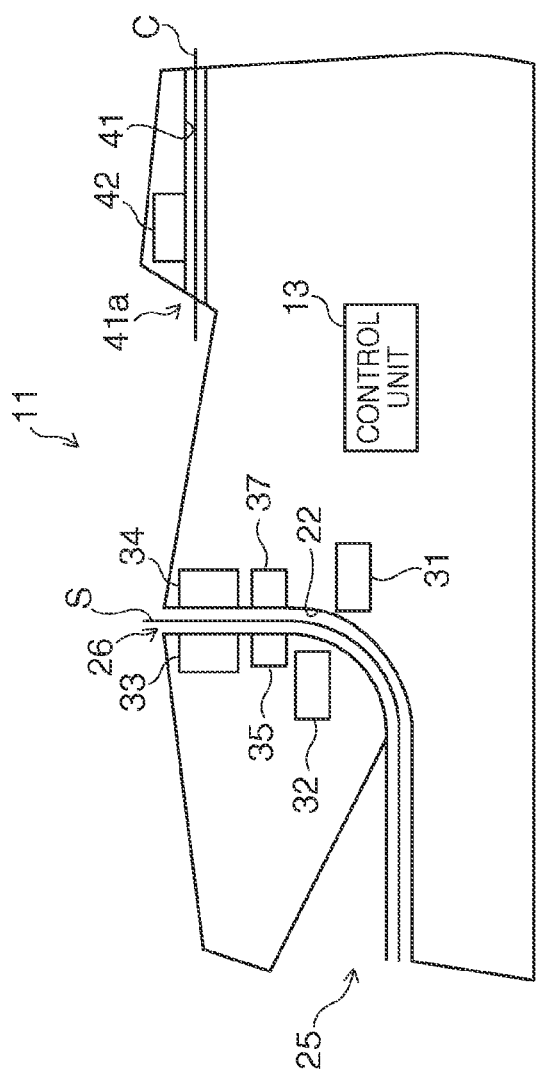
FIG. 14 describes a hybrid device 11 in an image reading and printing system according to a second embodiment of the invention.
Figure 14B:
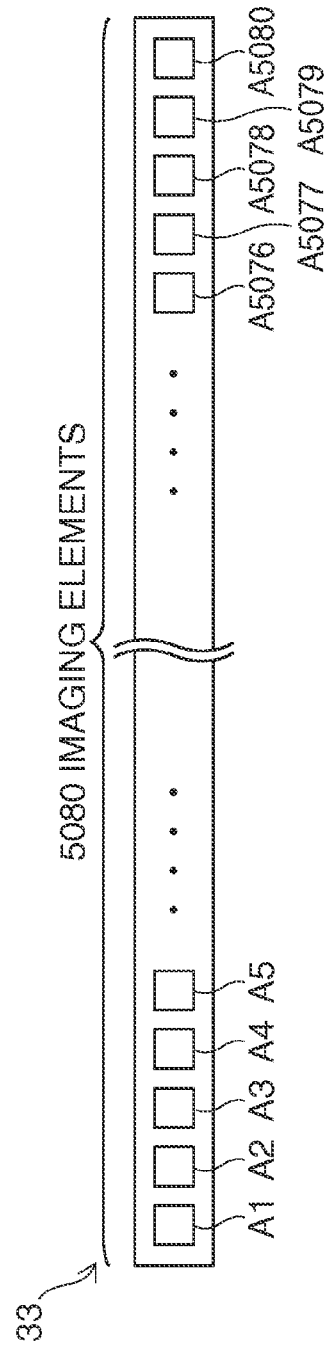

FIG. 14 shows the main parts of a hybrid device 11 according to this embodiment of the invention. FIG. 14A is a section view showing the main parts of the hybrid device 11, and FIG. 14B describes the imaging elements. Note that the roll paper exit 27 shown in FIG. 2 is omitted in FIG. 14A.

As shown in FIG. 14A, a back-side printing unit 31 for printing on the back of cut sheet S, and a front-side printing unit 32 for printing on the front of a cut sheet S, are disposed to the cut sheet transportation path 22. A first image reading sensor 33, second image reading sensor 34, first light source unit 35, and second light source unit 37 are disposed near the cut sheet transportation path 22. In this second embodiment of the invention the first image reading sensor 33 and second image reading sensor 34 are disposed across the width of the cut sheet S (that is, in the direction perpendicular to the transportation direction of the cut sheet S). The first light source unit 35 and second light source unit 37 each have groups of red LEDs that emit red light, green LEDs that emit green light, and blue LEDs that emit blue light. An image of the cut sheet is captured by sequentially driving the LEDs to emit red, green, and blue light on a specific cycle.

A card C inserted from the card insertion opening 41a is conveyed through the card transportation path 41. A card image reading sensor 42 for capturing an image of the surface of the card C is disposed to the card transportation path 41. In this embodiment of the invention the card image reading sensor 42 is rendered by a CIS imaging sensor similarly to the first image reading sensor 33 and second image reading sensor 34. The card image reading sensor 42 also has a light source unit (not shown in the figure) having a light source including red LEDs, green LEDs, and blue LEDs.

The hybrid device 11 according to this embodiment of the invention can scan cut sheets S and other media at a resolutions of 600 dpi and 300 dpi. More specifically, the hybrid device 11 has two read modes with different imaging conditions. The hybrid device 11 also has a control unit 13, and the control unit 13 controls operation of the hybrid device 11.

As shown in FIG. 14B, the first image reading sensor 33 has a plurality (5080) of imaging elements A1-A5080 arrayed in a line across the width of the read media. Imaging elements A1-A5080 each include a photodiode, which is a photoelectric conversion device corresponding to a pixel, that converts the light incident thereto to an electric charge, and a CCD that can transfer the charge received from the photodiode. The imaging elements A1-A5080 output the size of the charge that is produced according to the amount of incident red, green, and blue light that is reflected as an analog electric signal on a predetermined cycle. The second image reading sensor 34 and card image reading sensor 42 are configured identically to the first image reading sensor 33. Note that the numeric part of the identification codes A1-A5080 assigned to the imaging elements denotes the position of that imaging element from the left end of the sensor when looking at the surface of the scanned medium.

Figure 15A:
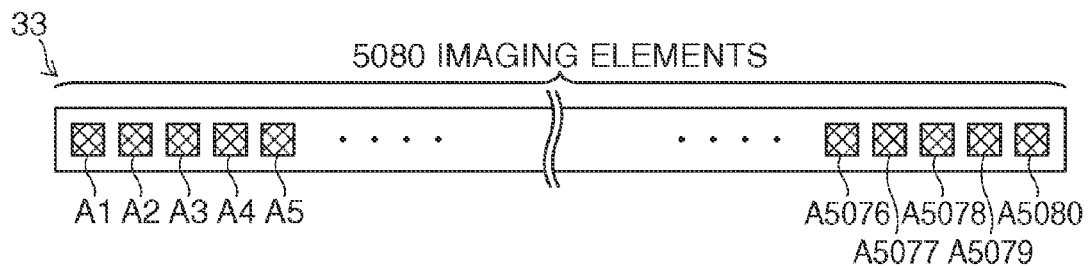
FIG. 15 describes the imaging elements used in different reading modes.
Figure 15B:
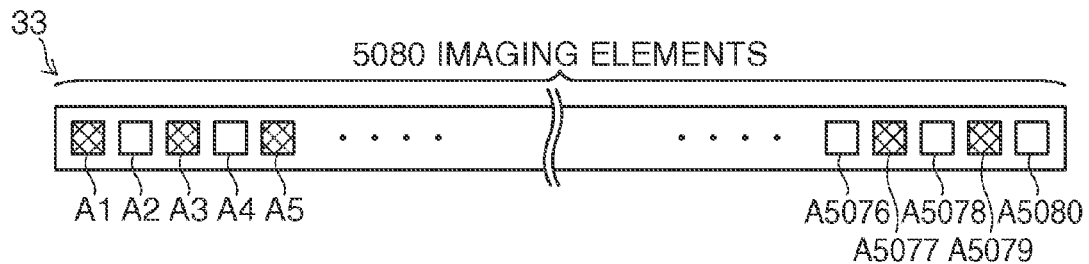
Figure 15B:
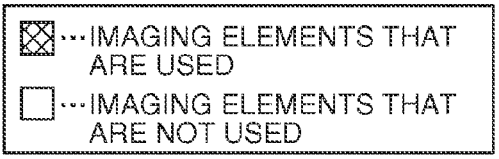

FIG. 15 describes the imaging elements used in each read mode. FIG. 15A shows the imaging elements that are used when scanning a subject in the 600 dpi mode, and FIG. 15B shows the imaging elements that are used when scanning a subject in the 300 dpi mode. Note that the imaging elements A1-A5080 marked with cross hatching are the imaging elements that are used in the respective scanning mode. As shown in FIG. 15A, all imaging elements A1-A5080 are used when reading in the 600 dpi mode. As shown in FIG. 15B, a subset of the imaging elements A1-A5080 is used in the 300 dpi mode. In this embodiment of the invention the odd-numbered imaging elements A1, A3, A5, . . . A5077, A5079 are used in the 300 dpi mode.

Figure 16:
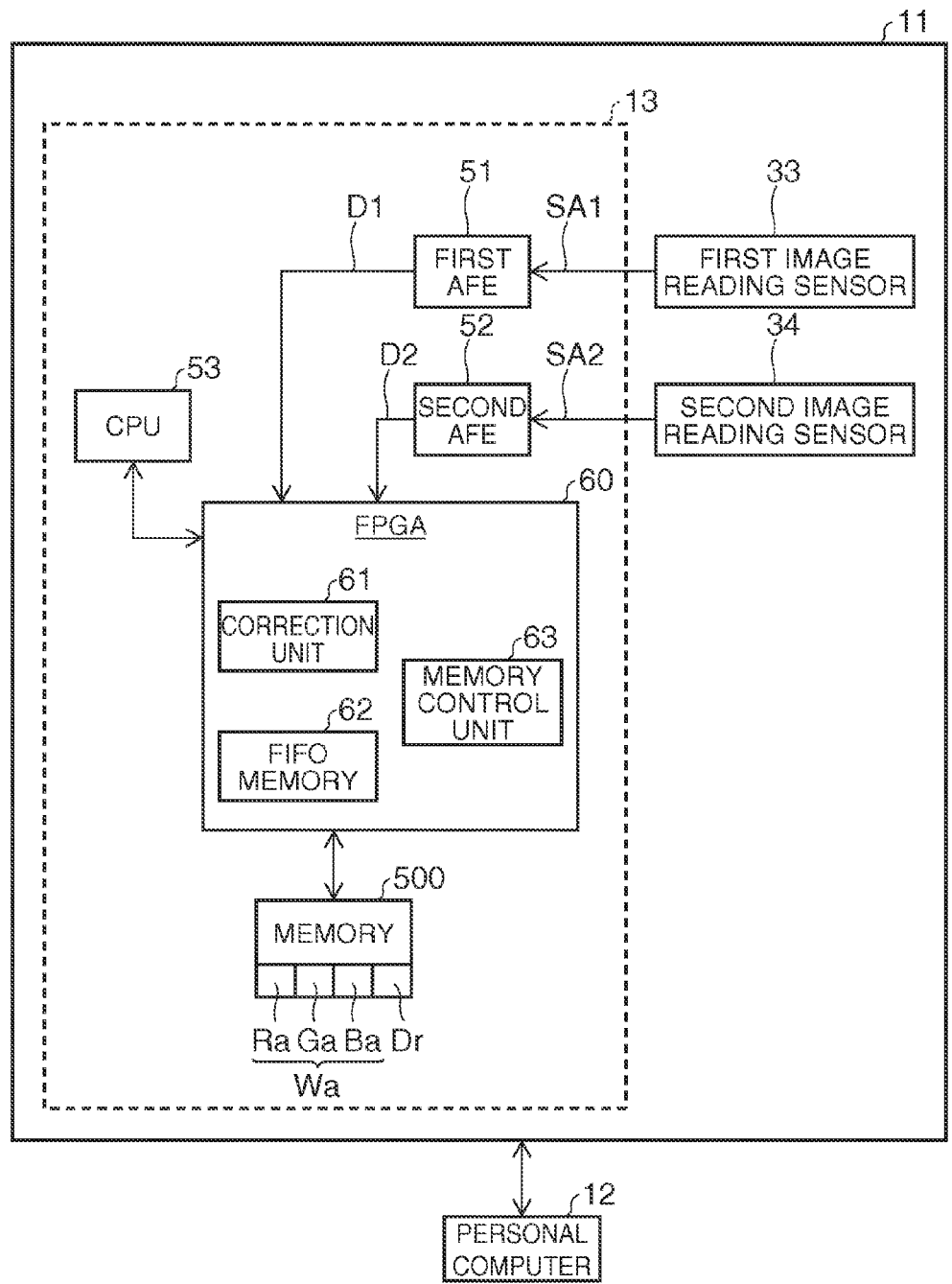
FIG. 16 is a block diagram showing the main parts of the hybrid device 11.

FIG. 16 is a block diagram showing the configuration of the main parts of the hybrid device 11. The hybrid device 11 has first and second image reading sensors 33 and 34, first and second AFE 51 and 52, a CPU 53, memory 500, and an FPGA 60. Note that the card image reading sensor 42 and corresponding AFE are not shown for brevity.

The first AFE 51 converts a first analog read signal SA1 output from the first image reading sensor 33 to a digital signal, and outputs the result as front image data D1. The second AFE 52 similarly converts a second analog read signal SA2 output from the second image reading sensor 34 to a digital signal, and outputs the result as back image data D2.

The CPU 53 controls operation of the hybrid device 11. The memory 500 is SDRAM configured with 8 banks as described below. White reference data Wa and black reference data Dr are stored in advance in memory 500. As described below, the white reference data Wa includes white reference data Ra for the red component, white reference data Ga for the green component, and white reference data Ba for the blue component. The image data D1 and D2 captured by the first and second image reading sensors 33 and 34 is also stored in memory 500.

The FPGA 60 includes a correction unit 61, memory control unit 63, and a plurality of FIFO memory devices 62.

The FIFO memory devices 62 read a specified amount of data from memory 500, and temporarily store the read data for correction processing by the correction unit 61.

The correction unit 61 corrects the shading of the image data D1 and D2 using the white reference data Wa and black reference data Dr appropriate to the image data D1 and D2.

The memory control unit 63 controls reading data stored in memory 500.

Note that shading correction compensates for variations in the sensitivity of the imaging elements A1-A5080 (that is, photodiodes) of the image reading sensors 33 and 34, and for variations in the output of the light sources (red LEDs, green LEDs, blue LEDs).

The white reference data Wa includes a plurality of white reference data values appropriate to the characteristics of the imaging elements A1-A5080 (red LEDs, green LEDs, blue LEDs). The black reference data Dr includes a plurality of black reference data values appropriate to the characteristics of the imaging elements A1-A5080.

The white reference data Wa is acquired as follows. The procedure for acquiring the white reference data Wa for the red LEDs of the imaging elements A1-A5080 (that is, the white reference data Ra for the red component, also referred to as the red component white reference data Ra) is described below. The red LEDs are turned on to illuminate a standard white reference plate (not shown in the figure) disposed to the hybrid device 11. The light reflected by the white reference plate is incident to the imaging elements A1-A5080, and each of the imaging elements A1-A5080 outputs a signal. These signals are converted to digital signals to acquire the white reference data Ra for the red LEDs. Note that the white reference data Ga for the green LEDs (also referred to as the green component white reference data Ga) and the white reference data Ba for the blue LEDs (also referred to as the blue component white reference data Ba) are acquired by the same method.

The black reference data Dr is acquired by converting the signals output from the imaging elements A1-A5080 when the imaging elements A1-A5080 are not exposed to ambient light and the light sources (red LEDs, green LEDs, blue LEDs) are off to digital signals. The black reference data Dr is thus unrelated to the characteristics of the LEDs, and is dependent upon the characteristics of the imaging elements A1-A5080. In addition, the reference data is prepared separately for the front image data D1 and the back image data D2.

The memory 500 in this second embodiment of the invention is configured identically to the memory 500 described in the first embodiment and shown in FIG. 5. That is, as shown in FIG. 5 in the first embodiment, the memory 500 includes eight banks 510 to 580, a row address buffer 502, a column address buffer 504, a data control unit 506, and a data I/O unit 508.

The first bank 510 includes a memory cell array 511, row decoder 512, sense amplifier 514, data latch 516, and column decoder 518. The second bank 520 to eighth bank 580 likewise include a memory cell array, row decoder, sense amplifier, data latch, and column decoder.

In this second embodiment of the invention the front image data D1 and corresponding reference data are stored in the first bank 510, and the back image data D2 and corresponding reference data are stored in the second bank 520. The third to eighth banks 530 to 580 are thus not used in this embodiment. In addition, the high two bits of the address supplied from the address bus are used as the bank address in this second embodiment of the invention, and the remaining 30 bits are used as the cell address specifying a particular memory cell in the memory cell array.

The row address composed of the high bits of the cell address is stored in the row address buffer 502. The column address composed of the low bits of the cell address is stored in the column address buffer 504. The row address stored in the row address buffer 502 is supplied to a row decoder rendered in each bank. The column address stored in the column address buffer 504 is supplied to a column decoder rendered in each bank.

Data stored in the specific area specified by the row address supplied from the address bus is amplified by the sense amplifier 514 and supplied to the data latch 516. The data control unit 506 inputs and outputs data to the column decoder disposed to the bank identified by the bank address supplied from the address bus. Data is communicated between the bank specified by the bank address and the FPGA 60 (FIG. 16) through a data bus connected to the data I/O unit 508.

Figure 17:
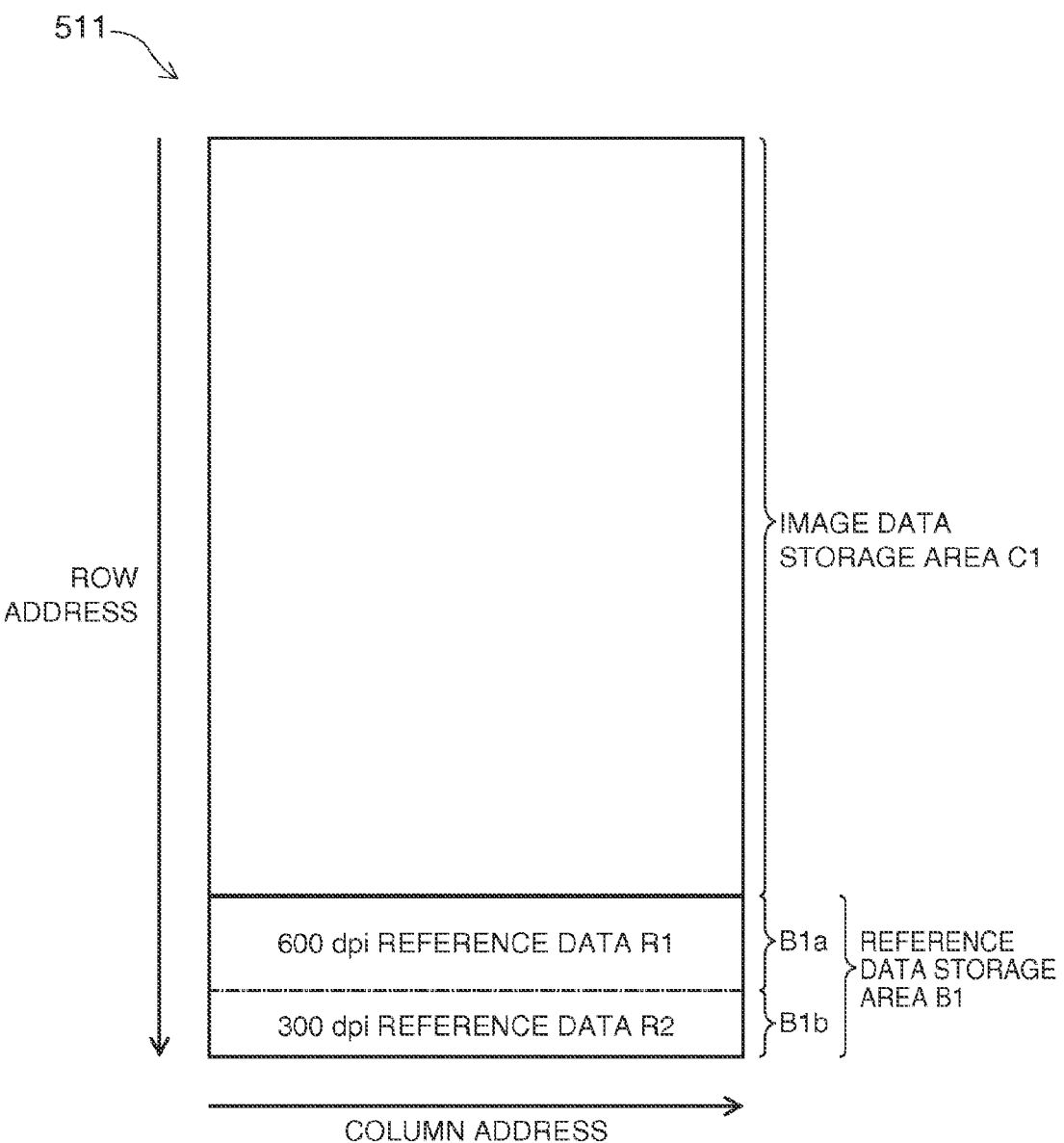
FIG. 17 describes data storage in a memory cell array.

FIG. 17 describes data storage in the memory cell array. Storing data to the memory cell array 511 of the first bank 510 is described by way of example here. Data is stored in the memory cell array of the second bank 520 that stores the back image data D2 and corresponding reference data in the same way as data is stored in the first bank 510 shown in FIG. 17.

The memory cell array 511 has an image data storage area Cl for storing the front image data D1 captured by the first image reading sensor 33, and a reference data storage area B1 in which the reference data used for shading correction is previously stored. The reference data includes 600 dpi reference data R1 that is used for shading correction of image data captured at 600 dpi, and 300 dpi reference data R2 that is used for shading correction of image data captured at 300 dpi. Reference data R1 and R2 are stored in separate storage areas B1a and B1b.

Figure 18:
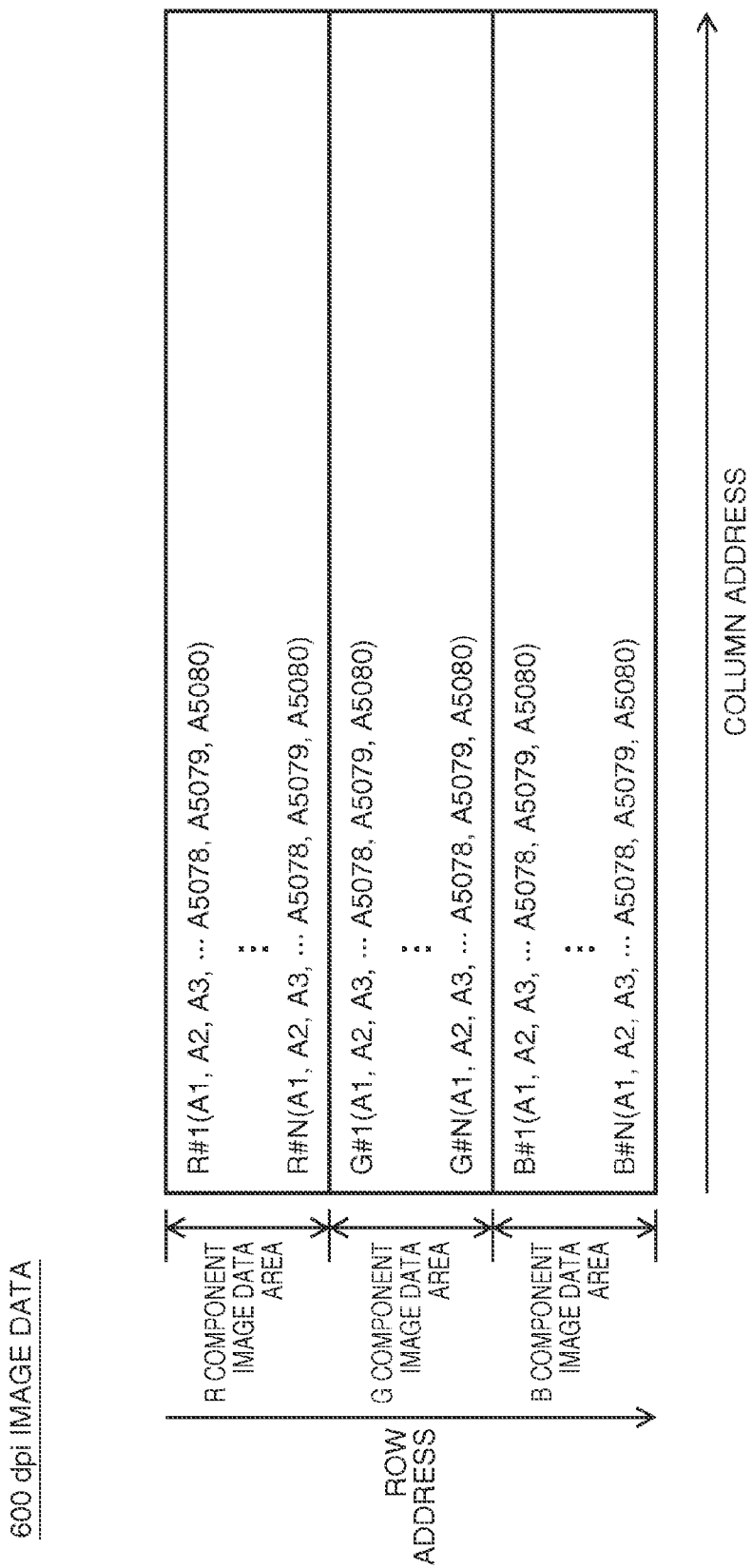
FIG. 18 describes storing image data with a resolution of 600 dpi.

FIG. 18 describes storing image data captured at 600 dpi. The reference numerals used in FIG. 18 are described using "R# (A1)" as an example. In this symbol "R" denotes image data acquired when the red LEDs are on, and therefore means data for the red component of image data captured with red, green, and blue (RGB) components. The index #1 identifies image data on line 1 (the first line) of the image data when the subject was scanned, and "(A1)" identifies the pixel data for the one pixel corresponding to the output signal of imaging element A1 (see FIG. 14). The reference R# (A1) therefore identifies the pixel data for the one pixel corresponding to the output signal of imaging element A1 on the first line of the image data when the red LED is on.

Note that for brevity the symbols R#1 (A1), R#1 (A2), R#1 (A3), . . . , R#1 (A5078), R#1 (A5079), R# (A5080) are abbreviated to R#1 (A1, A2, A3, . . . , A5078, A5079, A5080) in the figure.

In addition, the data for one pixel is 8 bits long. In this second embodiment of the invention the hybrid device 11 transfers the scanned subject data N lines (N scans) at a time and generates N lines of pixel data.

Note, further, that the symbol G in FIG. 18 denotes data for the green component of the RGB image data, and B denotes data for the blue component of the RGB image data.

The R component of the front image data D1 scanned at 600 dpi is stored in the red component image data area reserved in image data storage area Cl (FIG. 17). The G component image data is likewise stored in a reserved G component image data area, and the B component image data is stored in a reserved B component image data area.

Because all imaging elements A1-A5080 are used when scanning at 600 dpi (see FIG. 15A) the pixel data output from the imaging elements A1-A5080 is stored sequentially to each line (#1-#N). Note that while the pixel data is stored contiguously, the pixel data cannot all be stored to the same row address, and the pixel data for one line is therefore stored across a plurality of row addresses. More specifically, data for the 80 pixels R#1 (A1-A80) is stored continuously to the same row address (such as row address RA0), and data for the next 80 pixels R#1 (A81-A160) is stored continuously to a separate row address (such as row address RA1). Note, further, that the number of pixels for which data is stored continuously is not limited to the foregoing, and data for any specified number of pixels (such as 2, 4, or 8 pixels) may be stored continuously. Note, further, that this specific number of pixels preferably corresponds to the burst length described below.

FIG. 19 describes storing the 600 dpi reference data R1. The 600 dpi reference data R1 is stored in a specific area B1a in memory cell array 511 (FIG. 17). The reference numerals used in FIG. 19 are described belowusing "Ra (A1)" for example. The symbol Ra denotes the red component white reference data as described above. "(A1)" identifies white reference data for imaging element A1. More specifically, "Ra(A1)" means the red component white reference data Ra for imaging element A1. Likewise, "Ga (A1) means the green component white reference data Ga for imaging element A1, and "Ba (A1)" means the blue component white reference data Ba for imaging element A1. "Dr (A1)" means the black reference data for imaging element A1.

Note also that for brevity "Ra (A1, A2, . . . A79, A80)" means that the red component white reference data for the 80 pixels Ra (A1)-Ra (80) is stored continuously to a specified area. Note, further, that each white reference data value and black reference data value is 8 bits long.

As shown in FIG. 19, 80 red, green, and blue component white reference data values and black reference data values each are stored continuously to row addresses N–(N+62). For example, white reference data Ra (A1-A80) is sequentially stored continuously for the red component white reference data Ra in row address N. Note, also, that if the 5080 reference data values are stored in blocks of 80 values each at a different row address, there will be 40 reference data values stored to the last row address. As a result, 40 reference data values are stored continuously to row address (N+63).

Note, further, that the number of reference data values stored continuously to the same row address is not limited to the number shown in FIG. 19. For example, the reference data may be divided into a plurality of reference data blocks each comprising a specified number of reference data values (such as 2, 4, or 8, for example), and this specified number of reference data values in each reference data block can be stored continuously to the same row address. Note, further, that this specified number preferably corresponds to the burst length described below.

Figure 20:
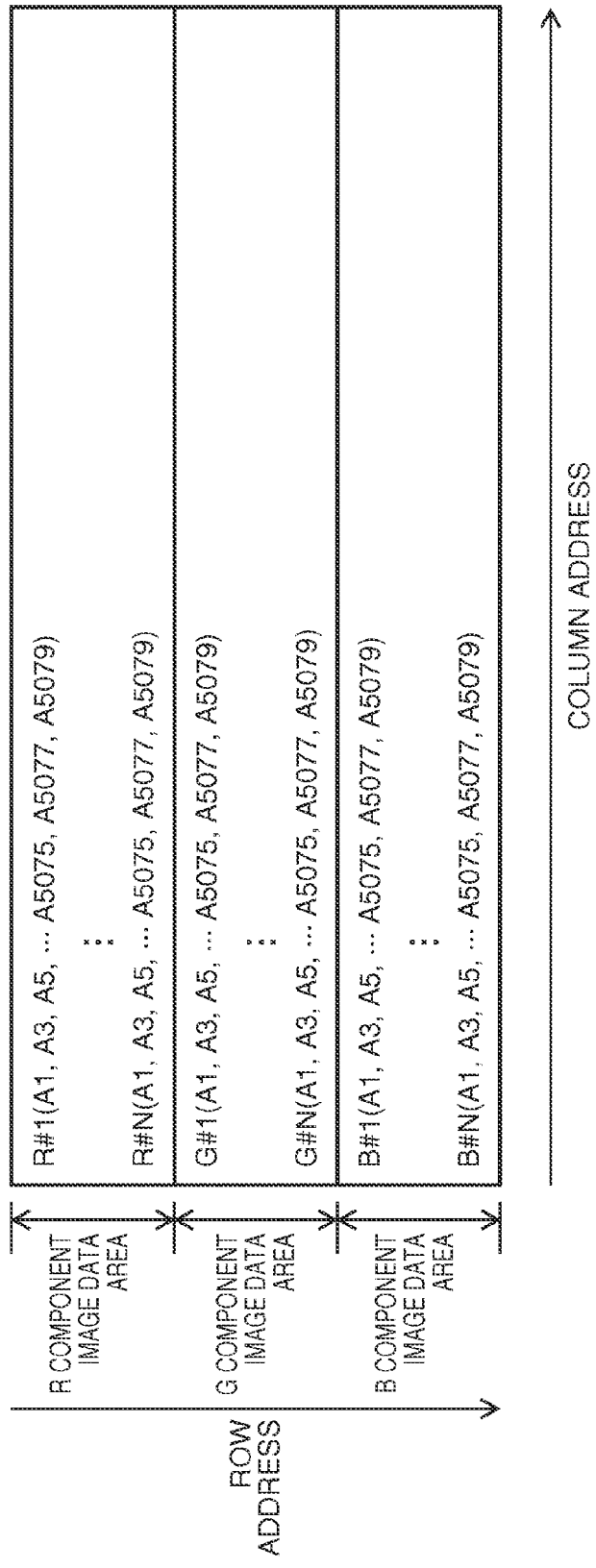
FIG. 20 describes storing image data with a resolution of 300 dpi.

FIG. 20 describes storing image data scanned at 300 dpi. The same reference numerals used in FIG. 18 are used in FIG. 20.

The R component of the front image data D1 scanned at 300 dpi is stored in a red component image data area reserved in the image data storage area C1 (FIG. 17). Because the 300 dpi image data is produced using the odd-numbered imaging elements A1, A3, A5 . . . A5077, A5079, the amount of stored image data is half that of the image data scanned at 600 dpi. Note that when scanning at 300 dpi, pixel data for the scanned subject is transferred N lines (N scans) at a time to generate N lines of pixel data in the same way as when scanning at 600 dpi. The pixel data output from the odd-numbered imaging elements A1, A3 . . . A5079 is stored sequentially. Note, further, that the pixel data output by imaging elements A1, A3 . . . A5079 is stored sequentially by line (#1-#N). Also note that while the pixel data is stored continuously by line (#1-#N), the pixel data for one line cannot all be stored to the same row address, and is therefore stored across a plurality of row addresses. More specifically, data for the 80 pixels R#1 (A1, A3, . . . A161, A159) is stored continuously to the same row address, and data for the next 80 pixels R#1 (A161, A163, . . . A317, A319) is stored continuously to a separate row address. Note, further, that the number of pixels for which data is stored continuously is not limited to the foregoing, and data for any specified number of pixels (such as 2, 4, or 8 pixels) may be stored continuously. Note, further, that this specific number of pixels preferably corresponds to the burst length described below.

FIG. 21 describes storing the 300 dpi reference data R2. The 300 dpi reference data R2 is stored in a specific area B1b in memory cell array 511 (FIG. 17). The reference numerals used in FIG. 21 are the same as used in FIG. 19, and further description thereof is thus omitted.

The reference data needed for correcting 300 dpi image data is the reference data for the odd-numbered imaging elements A1, A3, . . . A5077, A5079 of the first image reading sensor 33. The 300 dpi reference data R2 therefore contains only the required reference data used for correction. The reference data is stored in the same way as the 600 dpi reference data. That is, a specified number of red, green, and blue component white reference data values and black reference data values each are stored continuously to the same row address. For example, 80 red, green, and blue component white reference data values and black reference data values each are stored continuously to row addresses P−(P+30), and 60 of each of said reference data values are stored to row address (P+31).

Note, further, that the number of reference data values stored continuously to the same row address is not limited to the foregoing. For example, the reference data may be divided into a plurality of reference data blocks each comprising a specified number of reference data values (such as 2, 4, or 8, for example), and this specified number of reference data values in each reference data block can be stored continuously to the same row address. Note, further, that this specified number preferably corresponds to the burst length described below.

Figure 22:
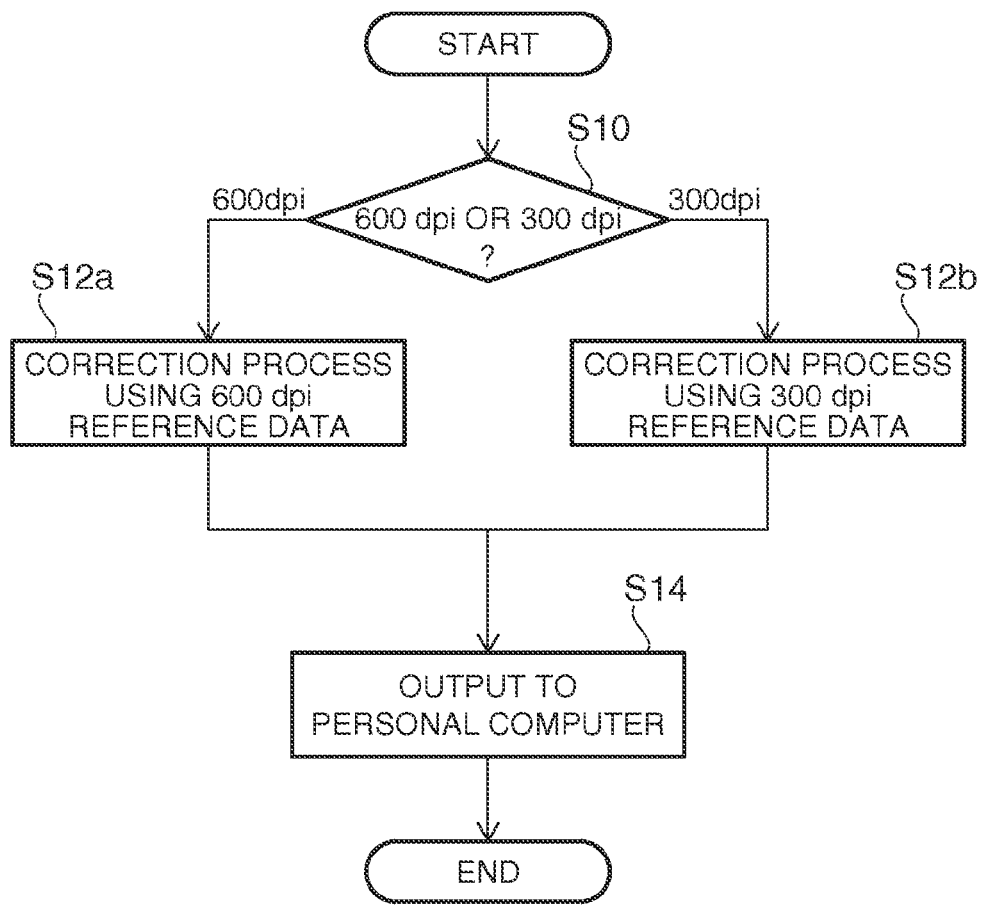
FIG. 22 is a flow chart of a shading correction process.

FIG. 22 is a flow chart of the shading correction process.

The FPGA 60 first determines if the front image data D1 to which the shading correction process is to be applied was scanned at 600 dpi or 300 dpi (step S10). If the image data was captured in the 600 dpi scanning mode, the correction unit 61 (FIG. 15) corrects shading using the 600 dpi reference data R1 stored in memory 500 (step S12a).

If the image data was captured in the 300 dpi scanning mode, the correction unit 61 corrects shading using the 300 dpi reference data R2 stored in memory 500 (step S12b).

The shading-corrected pixel data is then output sequentially to the computer 12.

Figure 23A:
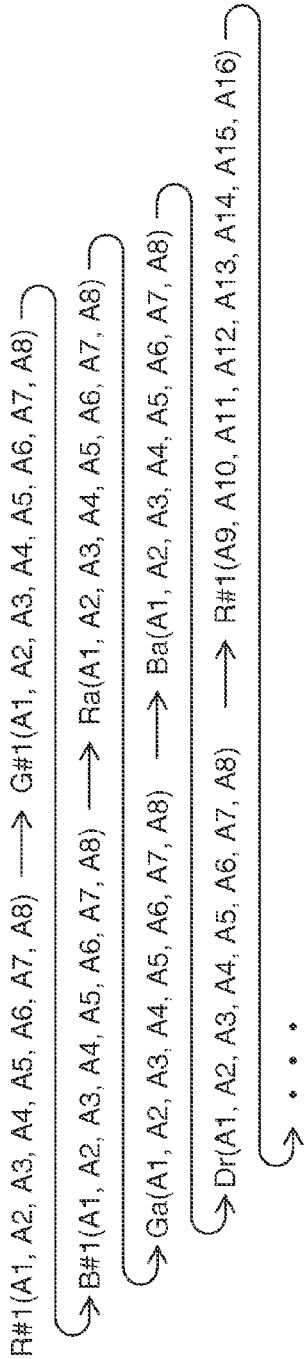
FIG. 23 describes the sequence for reading data from memory.
Figure 23B:
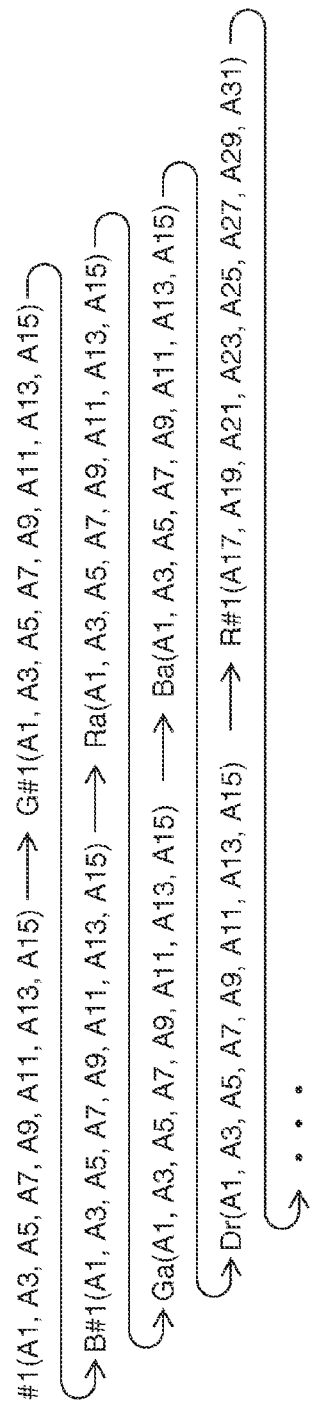

FIG. 23 describes the sequence in which data is read from memory 500 while correcting shading. FIG. 23A describes the read sequence when correcting shading in 600 dpi image data, and FIG. 23B describes the read sequence when correcting shading in 300 dpi image data.

Data is read from memory 500 in a burst access mode using a specified burst length. In the burst access mode data stored to consecutive addresses with the same row address in the same memory bank is read or written (accessed) continuously from a specified number of addresses synchronized to an external clock. The number of addresses that are accessed at one time is the burst length. The burst length is generally selected from among a number of burst lengths, such as 2, 4, or 8. In this embodiment of the invention data is mainly read using a burst length of 8.

As shown in FIG. 23A, when correcting the shading in 600 dpi image data, the memory control unit 63 (FIG. 16) reads the R component pixel data for the eight pixels R#1 (A1, A2, . . . A7, A8) on line 1 of the image data by burst access mode, and sequentially reads the G component and B component pixel data for the eight pixels G# (A1, A2, . . . , A7, A8) and B# (A1, A2, . . . , A7, A8) by burst access. Next, the R, G, and B component white reference data values Ra (A1, A2, . . . , A7, A8), Ga (A1, A2, . . . , A7, A8), Ba (A1, A2, . . . , A7, A8), and black reference data values Dr (A1, A2, . . . , A7, A8) used for correcting the shading of the read pixel data is read sequentially by burst access.

The read R, G, B component pixel data, R, G, and B white reference data, and black reference data is stored to corresponding areas in FIFO memory 62. Of the data stored in FIFO memory 62, the correction unit 61 corrects shading using the data required to correct the shading of one pixel (such as R#1 (A1), G#1 (A1), B#1 (A1), Ra (A1), Ga (A1), Ba (A1), Dr (A1)). When correcting the shading of the data stored in FIFO memory 62 is completed, the memory control unit 63 again reads the pixel data to be processed and the reference data required for the correction process by burst access. This operation continues until the shading of all pixel data stored in the memory cell array 511 has been corrected.

As shown in FIG. 23B, the shading of 300 dpi image data is corrected in the same way as described above. That is, the R, G, and B component pixel data, R, G, and B component white reference data, and black reference data is read by burst access, and shading is corrected.

Note, further, that the back image data D2 is likewise processed by reading image data and reference data by burst access from memory 500 and correcting shading using reference data prepared according to the resolution of the image data to be processed.

As described above, two sets of different reference data R1 and R2 (FIG. 17) are stored according to the image resolution (600 dpi or 300 dpi) in the memory 500 of the hybrid device 11. This reference data R1 and R2 stores the minimum amount of reference data required to correct image data scanned according to the corresponding resolution conditions. Therefore, by reading the corresponding reference data from memory when correcting image data shading, the data transfer rate can be improved because there is no need to select the reference data to be used for correction from among the stored reference data while reading.

A specified number of reference data values contained in the reference data corresponding to the pixel data read continuously from memory are also stored continuously to the same row address. As a result, the reference data required to correct the pixel data read from memory 500 can be read by burst access, and the reference data transfer rate can be further improved. The speed of the shading correction process applied to all pixels in the scanned subject image can therefore be improved.

C. Embodiment 3

Figure 24:
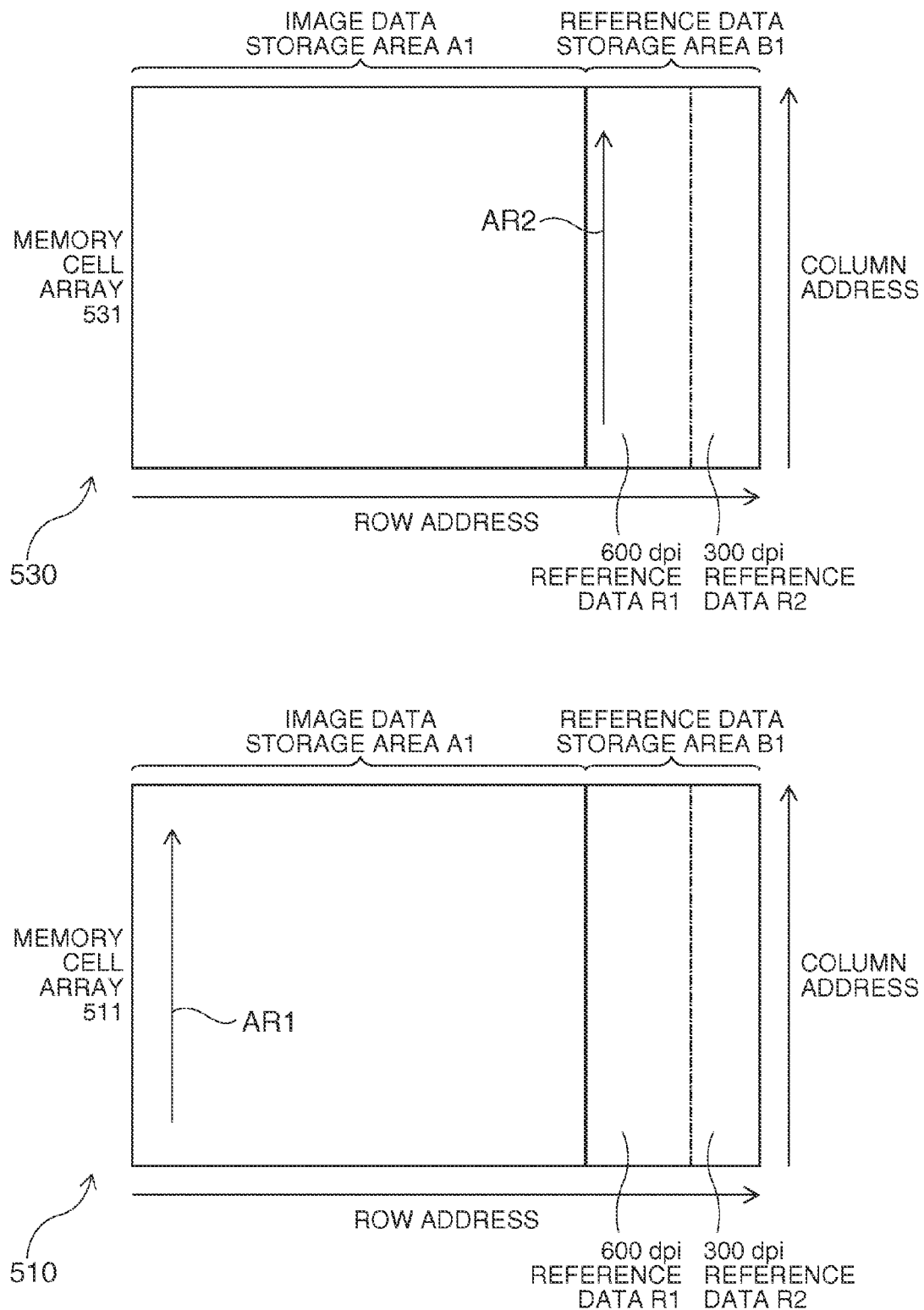
FIG. 24 is a first drawing used to describes the data reading procedure in the second embodiment of the invention.

FIG. 24 is a first drawing used to describe the data reading process in a third embodiment of the invention. In this third embodiment of the invention the front image data D1 is stored to first bank 510 and third bank 530. Note that the memory cell array of the third bank 530 includes an image data storage area Cl and a reference data storage area B1 identically to the memory cell array 511 of the first bank 510. As in the second embodiment, 600 dpi reference data R1 and 300 dpi reference data R2 are stored in advance to the memory cell arrays 511 and 513.

In addition, as in the second embodiment, when applying shading correction to image data at 600 dpi, the 600 dpi reference data R1 is read, and when applying shading correction to image data at 300 dpi, the 300 dpi reference data R2 is read.

As indicated by arrow AR1 in FIG. 24, when reading image data from first bank 510, the corresponding reference data is selected from the third bank as indicated by arrow AR2, and the reference data values contained in the reference data are read.

Note that the back image data D2 is stored in second bank 520 and fourth bank 540, and is read in the same way as the front image data D1. The procedure for reading data from memory 500 when correcting the shading of the front image data D1 is described by way of example below.

Figure 25:
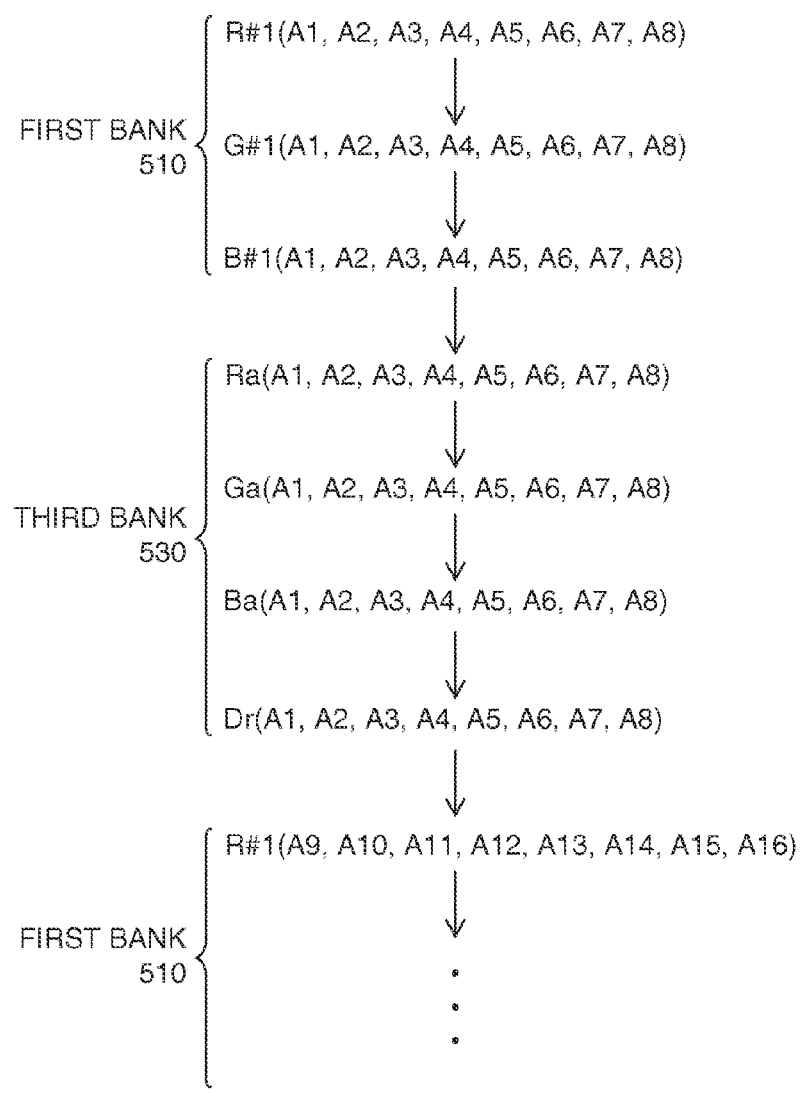
FIG. 25 is a second drawing for describing the data reading procedure in a third embodiment of the invention.

FIG. 25 is a second drawing describing the data reading procedure of the third embodiment. This example describes the reading process when correcting shading in image data captured at 600 dpi. First, the RGB component pixel data stored in the first bank 510 is read by burst access mode. Next, the RGB component white reference data and black reference data stored in the third bank 530 is also read by burst access. A burst length of 8 is also used for burst access in this third embodiment of the invention. The pixel data and reference data read for 8 pixels is then stored in FIFO memory 62 (FIG. 16) as described in the second embodiment, and the correction unit 61 applies shading correction using the data required to correct the shading of one pixel. Note, further, that the shading of the back image data D2 stored in second bank 520 and fourth bank 540 is corrected in the same way as the front image data D1.

As described above, because the image data and reference data are read from separate banks when correcting shading in this third embodiment of the invention, accessing (reading from) different row addresses in the same bank on a time-shared basis can be reduced. As a result, because precharging can be reduced, the correction data and reference data transfer rate can be improved compared with the second embodiment. Throughput when applying the shading correction process to the read image data D1 and D2 can therefore be improved.

D. Variation 1

The invention is not limited to the first to third embodiments described above. Of the components of the first to third embodiments described above, components other than the essential components described in the independent claims of the invention are additional components and can be omitted as appropriate. In addition, the invention is not limited to the embodiments and variations thereof described above, and can be rendered in various other ways without departing from the scope of the accompanying claims. Some examples of such variations are described below.

D1. Variation 1-1

The foregoing first to third embodiments of the invention are described using a hybrid device that combines a scanner and printer by way of example, but the invention can obviously also be applied in a scanner that does not have a printer function, a hybrid device that also has a fax function, and other types of devices that can read, scan, or capture images in other ways.

D2: Variation 1-2

SDRAM is used as the memory 500 in the first to third embodiments described above, but the invention can obviously also be applied to image capture devices having a plurality of memory banks, including DDR2SDRAM (Double-Data-Rate2 Synchronous Dynamic Random Access Memory) and DDR3SDRAM (Double-Data-Rate3 Synchronous Dynamic Random Access Memory).

D3. Variation 1-3

The hybrid device 11 in the foregoing first embodiment has two image reading sensors 33 and 34, but the invention can obviously also be applied to hybrid devices having only one image reading sensor and to hybrid devices having three or more image reading sensors. Furthermore, a CIS type image reading sensor is used as the image reading sensor in the embodiments described above, but CCD (charge-coupled device) type image reading sensors may be used instead.

D4. Variation 1-4

The memory control unit 57 reads the back image data D2 after reading the front image data D1 is completed through an area specified by a particular row address in the first embodiment described above, but the memory control unit 57 could read the back image data D2 while reading the front image data D1. Precharges can be suppressed and the data transfer rate of the memory 500 can be increased in this configuration if different banks are used for writing and reading the image data D1 and D2 and reading the correction data.

D5. Variation 1-5

The correction data stored in each bank in the foregoing first embodiment is described as white reference data and black reference data used for shading correction, but the correction data may be the data used when applying other correction processes to image data, such as gamma correction and white balance correction.

D6. Variation 1-6

In the foregoing first to third embodiments the memory 500 is rendered with eight banks, but the number of banks is not limited to 8. More specifically, the number of banks may be set desirably insofar as image data can be read from a different bank than the bank to which image data is being written, and the correction data can be read from a different bank than the banks to which image data is written and read. More specifically, in an image reading device that captures only front image data D1, for example, the memory 500 may be rendered with three or more banks.

D7. Variation 1-7

Correction data is stored in all banks in the first to third embodiments above, but image data can be read from a different bank than the bank to which image data is being written, and correction data can be read from a different bank than the banks to which image data is being written and read. More specifically, for example, in an image reading device that handles only the front image data D1, correction data is stored to three or more banks. With this configuration, even if the bank to which the front image data D1 is written changes, the front image data D1 can be written and read, and the correction data can be read, from different banks.

D8. Variation 1-8

In the first to third embodiments, when the front image data D1 is read, the memory control unit 57 selects the bank with an identification number that is one less than the bank to which the back image data D2 is being written as the bank for reading the first correction data. However, the memory control unit 57 may select the bank with an identification number 2 less than the bank to which the back image data D2 is being written, or the bank with an identification number that is 1 greater than the bank to which the back image data D2 is being written. This also applies when the memory control unit 57 reads the back image data D2. That is, the memory control unit 57 can select the bank from which the correction data is read according to a predetermined rule that enables reading the correction data from a different bank than the banks used for writing and reading the image data.

D9. Variation 1-9

Some of the functions rendered by software in the foregoing embodiment may be rendered by hardware, and some of the functions rendered by hardware in the foregoing may be rendered by software.

E. Variation 2

The embodiments of the invention described above can also be modified as described below.

E-1. Variation 2-1

In the second and third embodiments described above the hybrid device 11 has two scanning conditions with different image resolutions, and stores reference data R1 and R2 for the different scanning conditions in memory 500 (FIG. 17), but the types of reference data are not so limited. That is, when the hybrid device 11 has other scanning conditions reference data corresponding to those conditions may be stored in memory 500. More specifically, reference data corresponding to each scanning mode with different scanning conditions may be stored in memory 500. The reference data values of the reference data used for correction are preferably stored continuously to the same row address in blocks of a predetermined size (corresponding to the burst length). In other words, when shading correction is applied to image data scanned according to a particular condition, the reference data values corresponding to each scanning condition are stored continuously in blocks of a predetermined size so that the reference data values used for shading correction can be read from memory by burst access.

For example, if the hybrid device 11 has a color mode for producing color image data based on the scanned subject and a monochrome mode for producing monochrome data based on the scanned subject as two scanning conditions instead of using resolution as a condition, reference data for the color mode and reference data for the monochrome mode are stored in memory 500. If this configuration has red LEDs, green LEDs, and blue LEDs as the three light sources, the subject can be scanned in the monochrome mode using one of three light sources, such as the red LEDs. As a result, white reference data corresponding to the light source that is used for reading (such as red component white reference data) and black reference data may be stored in memory as the reference data for the monochrome mode, and other white reference data that is not used for shading correction need not be stored. This configuration can improve the speed that reference data can be read from memory when applying shading correction to image data read in the monochrome mode.

E-2. Variation 2-2

FIG. 26 is a table describing the correlation between scanning modes and reference data in variation 2-2.

In the second and third embodiments the hybrid device 11 has two reading modes, but the number of reading modes is not so limited. For example, if the hybrid device 11 uses a color mode for outputting the scanned image data as a color image and a monochrome mode for outputting the scanned image data as a monochrome image as two conditions in addition to using resolution as a condition, reference data corresponding to each scanning mode may be stored in memory 500. By reading reference data corresponding to the scanning mode from memory 500, this configuration can improve the reference data transfer rate. For example, when producing color image data at a resolution of 600 dpi, shading correction can be applied using first correction data.

E-3. Variation 2-3

In the second and third embodiments, reference data for the front image data D1 and reference data for the back image data D2 are stored in one or two of the eight banks of memory 500, but the number of banks used for storage is not so limited. For example, the front image data D1 may be split and stored to first to fourth banks 510 to 540, and the back image data D2 may be split and stored to fifth to eight banks 550 to 580. In this configuration plural types of reference data corresponding to each scanning mode are stored in advance for front image data D1 in first to fourth banks 510 to 540, and plural types of reference data corresponding to each scanning mode are stored in advance for back image data D2 in fifth to eight banks 550 to 580. In addition to improving the reference data transfer rate, this configuration also enables using the memory 500 banks effectively.

E-4. Variation 2-4

In the second and third embodiments white reference data and black reference data are used as examples of correction data stored in memory, but the correction data stored in memory is not so limited and various types of correction data used for applying correction processes according to the characteristics of the imaging elements may be stored. For example, gamma values used for gamma correction appropriate to each scanning mode may be stored in memory 500. By thus reading gamma data appropriate to the scanning mode from memory, the gamma correction data transfer rate can be improved. Note that these gamma correction values are preferably stored continuously to the same row address in blocks of a predetermined size so that the data can be retrieved in a burst access mode.

E-5. Variation 2-5

In the second and third embodiments described above, data used for shading correction is read from memory in the order R component image data, G component image data, B component image data, R component white reference data, G component white reference data, B component white reference data, black reference data, but the invention is not so limited and data can be read from memory in any desirable order. Even if the scanning mode differs, this configuration enables reading the required reference data by burst access and can therefore improve the reference data transfer rate.

E-6. Variation 2-6

The foregoing first to third embodiments of the invention are described using a hybrid device that combines a scanner and printer as an example of an image reading device, but the invention is not so limited. For example, the image reading device of the invention may be a scanner that does not have a printer function, or a scanner that reads only one side.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An image reading device comprising:
    an image reading sensor that captures an image of a subject;
    a converter that converts a signal output from the image reading sensor to image data:
    memory that has
        a first bank that has a first image data storage area for storing data units segmenting the image data, a first correction data storage area for storing correction data for correcting the image data,
        a second bank that has a second image data storage area for storing data units and a second correction data storage area for storing the correction data, which is the same as the correction data stored in the first correction data storage area, and
        a third bank that has a third image data storage area for storing data units and a third correction data storage area for storing the correction data, which is the same as the correction data stored in the first correction data storage area;
    a memory control unit that writes a first data unit to the first image data storage area in the first bank, reads a second data unit stored in the second image data storage area in the second bank while the first data unit is written to the first image data storage area, and reads the correction data in the third correction data storage area while the first data unit is written to the first image data storage area and the second data unit stored in the second image data storage area is read; and
    a correction process unit that corrects the second data unit using the correction data stored in the third correction data storage area.

2. The image reading device described in claim 1, wherein:
    the correction process unit corrects shading; and
    the correction data is white reference data and black reference data is used for correcting the shading.

3. The image reading device described in claim 1, wherein:
    the image reading sensor has a plurality of imaging elements;
    the correction process unit applies a correction process according to at least the characteristics of each imaging element to pixel data in the image data;
    the memory is SDRAM;
    the image reading device has a plurality of scanning modes with different reading conditions that are set when capturing an image by the image reading sensor;
    the first, second and third correction data storage areas each stores plural different types of correction data corresponding to the plural scanning modes; and
    the correction process unit corrects the second data unit using correction data appropriate to the scanning mode that is set when capturing image data.

4. The image reading device described in claim 3, wherein:
    at least one of the different reading conditions includes resolution as a condition that is set when the image scanning sensor scans a subject.

5. The image reading device described in claim 3, wherein:
    the different reading conditions include as conditions a color mode that produces color image data based on the scanned subject, and a monochrome mode that produces monochrome image data based on the scanned subject.

6. A method of correcting image data in an image reading device, comprising:
    capturing an image of a subject;
    converting a signal of the image to image data;
    writing a first data unit segmented from the image data to a first image data storage area of a first bank of a memory, the first bank also having a first correction data storage area;
    reading a second data unit stored in a second image data storage area of a second bank of the memory while the first data unit is written to the first image data storage area, the second bank also having a second correction data storage area;
    reading correction data stored in a third correction data area of a third bank of the memory while the first data unit is written to the first image data storage area and the second data unit is read from the second image data storage area, the third bank also having a third image data storage area; and
    correcting the second data unit using the correction data in the third correction data area.

* * * * *